United States Patent
Poe et al.

(10) Patent No.: US 11,008,432 B2
(45) Date of Patent: *May 18, 2021

(54) HIGHLY BRANCHED NON-CROSSLINKED AEROGEL, METHODS OF MAKING, AND USES THEREOF

(71) Applicant: BLUESHIFT MATERIALS, INC., San Marcos, TX (US)

(72) Inventors: Garrett Poe, Austin, TX (US); Alan Sakaguchi, San Antonio, TX (US); Nicole Lambdin, San Marcos, TX (US)

(73) Assignee: BLUESHIFT MATERIALS, INC., Spencer, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/296,497

(22) Filed: Mar. 8, 2019

(65) Prior Publication Data

US 2019/0263998 A1   Aug. 29, 2019

Related U.S. Application Data

(63) Continuation of application No. 15/297,276, filed on Oct. 19, 2016, now Pat. No. 10,287,411.

(60) Provisional application No. 62/248,763, filed on Oct. 30, 2015, provisional application No. 62/262,055, filed on Dec. 2, 2015, provisional application No. 62/337,947, filed on May 18, 2016, provisional application No. 62/408,862, filed on Oct. 17, 2016.

(51) Int. Cl.
| | | |
|---|---|---|
| *B01D 69/12* | (2006.01) | |
| *B01D 71/64* | (2006.01) | |
| *C08G 73/10* | (2006.01) | |
| *C08J 9/26* | (2006.01) | |
| *C08J 9/28* | (2006.01) | |

(52) U.S. Cl.
CPC ............ *C08J 9/286* (2013.01); *B01D 69/125* (2013.01); *B01D 71/64* (2013.01); *C08G 73/10* (2013.01); *C08G 73/1046* (2013.01); *C08J 9/26* (2013.01); *C08J 9/28* (2013.01); *B01D 2323/30* (2013.01); *C08J 2201/048* (2013.01); *C08J 2201/0482* (2013.01); *C08J 2201/0502* (2013.01); *C08J 2205/026* (2013.01); *C08J 2205/05* (2013.01); *C08J 2300/202* (2013.01); *C08J 2379/08* (2013.01)

(58) Field of Classification Search
CPC .... B01D 71/64; C08G 73/10; C08G 73/1046; C08J 9/26; C08J 9/286; C08J 2205/05; C08J 2205/26; C08J 2300/202; C08J 2379/08

See application file for complete search history.

(56) References Cited

U.S. PATENT DOCUMENTS

| | | |
|---|---|---|
| 5,998,569 A | 12/1999 | Hogan et al. |
| 6,133,330 A | 10/2000 | Weiser et al. |
| 6,355,357 B1 | 3/2002 | Takahashi et al. |
| 6,359,107 B1 | 3/2002 | Connell et al. |
| 6,399,669 B1 | 6/2002 | Suzuki et al. |
| 6,576,683 B2 | 6/2003 | Yamaguchi et al. |
| 6,777,525 B2 | 8/2004 | Pater |
| 7,074,880 B2 | 7/2006 | Rhine et al. |
| 7,109,287 B2 | 9/2006 | Connell et al. |
| 7,399,439 B2 | 7/2008 | Lee et al. |
| 7,541,388 B2 | 6/2009 | Vazquez et al. |
| 7,691,911 B2 | 4/2010 | Lee et al. |
| 8,697,766 B2 | 4/2014 | Fricke et al. |
| 8,741,976 B2 | 6/2014 | Fricke et al. |
| 8,765,230 B1 | 7/2014 | Waldrop, III et al. |
| 8,974,903 B2 | 3/2015 | Meador et al. |
| 9,109,088 B2 | 8/2015 | Meador et al. |
| 9,206,298 B2 | 12/2015 | Rodman et al. |
| 9,309,369 B1 | 4/2016 | Meador |
| 9,434,831 B2 | 9/2016 | Rhine et al. |
| 9,434,832 B1 | 9/2016 | Meador |
| 9,469,732 B2 | 10/2016 | Weber et al. |
| 9,469,739 B2 | 10/2016 | Lee et al. |
| 9,598,548 B2 | 3/2017 | Mueller-Cristadoro et al. |
| 9,598,861 B2 | 3/2017 | Davis et al. |
| 9,650,487 B1 | 5/2017 | Guo et al. |
| 9,650,550 B2 | 5/2017 | Miyamoto et al. |
| 10,227,469 B1 * | 3/2019 | Williams ................ C08J 9/286 |
| 2004/0132845 A1 | 7/2004 | Rhine et al. |
| 2005/0096661 A1 | 5/2005 | Farrow et al. |
| 2006/0240216 A1 | 10/2006 | Stepanian et al. |

(Continued)

FOREIGN PATENT DOCUMENTS

| | | |
|---|---|---|
| CN | 1249713 | 4/2000 |
| CN | 1249730 | 4/2000 |

(Continued)

OTHER PUBLICATIONS

Johnson et al., "Mineralization of Clay/Polymer Aerogels: A Bioinspired Approach to Composite Reinforcement", Applied Materials & Interfaces, vol. 1, No. 6, pp. 1305-1309 (Year: 2009).*

Holte et al., "Degree of Branching in Hyperbranched Polymers," *Acta Polymer.*, 1997, 48: 30-35.

International Search Report and Written Opinion issued in Application No. PCT/US2016/057575, dated Mar. 20, 2017.

International Search Report and Written Opinion issued in Application No. PCT/US2016/055775.

International Preliminary Report on Patentability issued in International Application No. PCT/US2018/062833 dated Jun. 18, 2020.

(Continued)

*Primary Examiner* — Melissa A Rioja

(74) *Attorney, Agent, or Firm* — Norton Rose Fulbright US LLP

(57) ABSTRACT

Aerogel compositions, methods for preparing the aerogel compositions, articles of manufacture that include or are made from the aerogel compositions are described and uses thereof. The aerogels include a branched polyimide matrix with little to no crosslinked polymers.

10 Claims, 3 Drawing Sheets

(56) References Cited

U.S. PATENT DOCUMENTS

| | | |
|---|---|---|
| 2007/0238008 A1 | 10/2007 | Hogan et al. |
| 2010/0316550 A1 | 12/2010 | Leventis et al. |
| 2012/0007012 A1* | 1/2012 | Fricke .................... C08L 75/04 |
| | | 252/62 |
| 2012/0097907 A1 | 4/2012 | Bauer et al. |
| 2012/0134909 A1 | 5/2012 | Leventis et al. |
| 2013/0020117 A1 | 1/2013 | Yamato |
| 2013/0171520 A1 | 7/2013 | Nakayama et al. |
| 2014/0127494 A1 | 5/2014 | Yakuwa et al. |
| 2014/0272358 A1 | 9/2014 | Meador et al. |
| 2014/0287641 A1 | 9/2014 | Steiner, III |
| 2014/0322122 A1 | 10/2014 | Leventis et al. |
| 2014/0350134 A1 | 11/2014 | Rodman et al. |
| 2015/0166729 A1 | 6/2015 | Miyamoto et al. |
| 2016/0096949 A1 | 4/2016 | Evans et al. |
| 2017/0355829 A1* | 12/2017 | Sakaguchi ........... B01J 13/0091 |
| 2018/0112054 A1* | 4/2018 | Steiner, III ................ C08J 9/28 |
| 2019/0062517 A1* | 2/2019 | Steiner, III ................ C08J 9/28 |
| 2019/0290762 A1* | 9/2019 | Scholin .............. A61K 41/0028 |

FOREIGN PATENT DOCUMENTS

| | | |
|---|---|---|
| CN | 101795857 | 8/2010 |
| CN | 1861250 A | 5/2013 |
| CN | 103319141 | 9/2013 |
| EP | 2974858 | 1/2016 |
| JP | 05-247208 | 9/1993 |
| JP | 3186190 | 7/2001 |
| WO | WO 2007/011750 A2 | 11/2006 |
| WO | WO 2013/060341 A1 | 1/2007 |
| WO | WO 2017/074751 | 5/2017 |
| WO | WO 2017/212424 | 12/2017 |

OTHER PUBLICATIONS

Second Office Action from the China National Intellectual Property Administration issued in corresponding Application No. 201680064190.0 dated Jul. 3, 2020.
Office Action issued in European Application No. 17740095.9, dated Nov. 2, 2020.
International Search Report and Written Opinion issued in Application No. PCT/IB2017/053371, dated Aug. 28, 2017.
International Search Report and Written Opinion issued in Corresponding International Patent Application No. PCT/US2018/062833, dated Feb. 22, 2019.
Mochizuki, et al., "Preparation and Properties of Polyisoimide as a Polyimide-Precursor," Polymer Journal, 26(3): 315-323, 1994.
Office Action issued in corresponding Chinese Patent Application No. 201680064190.0, dated Sep. 25, 2019 (English translation provided).
Search Report issued in corresponding Chinese Patent Application No. 201680064190.0, dated Sep. 17, 2019 (English translation provided).
Office Action issued in Corresponding Chinese Application No. 201680063816.6, dated Jan. 26, 2021 (English Translation provided).
Search Report issued in Corresponding Chinese Application No. 2016800641900, dated Jan. 19, 2021 (English Translation provided).
*Synthesis and Application of Hyperbranched Polymer*, Guohua Jiang, ed., Northeast Normal University Press, 2012, pp. 45-48 (No English Translation provided).

* cited by examiner

HIGHLY BRANCHED NON-CROSSLINKED AEROGEL, METHODS OF MAKING, AND USES THEREOF

CROSS-REFERENCE TO RELATED APPLICATIONS

This application is a continuation of U.S. patent application Ser. No. 15/297,276 titled "HIGHLY BRANCHED NON-CROSSLINKED AEROGEL, METHODS OF MAKING, AND USES THEREOF" filed Oct. 19, 2016, which claims benefit to U.S. Provisional Application No. 62/248,763 titled "HIGHLY BRANCHED NON-CROSSLINKED AEROGEL" filed Oct. 30, 2015, U.S. Provisional Application No. 62/262,055 titled "HIGHLY BRANCHED NON-CROSSLINKED AEROGEL AND USES THEREOF" filed Dec. 2, 2015, and U.S. Provisional Application titled "HIGHLY BRANCHED NON-CROSSLINKED AEROGEL AND USES THEREOF" No. 62/337,947 filed May 18, 2016, and U.S. Provisional Application No. 62/408,862 titled "HIGHLY BRANCHED NON-CROSSLINKED AEROGEL, METHODS OF MAKING, AND USES THEREOF" filed Oct. 17, 2016, all of which are incorporated herein by reference in their entirety.

BACKGROUND OF THE INVENTION

A. Field of the Invention

The present disclosure relates to the field of aerogels. In particular, the invention concerns aerogels made from a branched polyimide matrix having low, or substantially no crosslinked polymers.

B. Description of Related Art

An aerogel is a porous solid that is formed from a gel, in which the liquid that fills the pores of the solid has been replaced with a gas. Shrinkage of the gel's solid network during drying is negligible or all together prevented due to the minimization of or resistance to the capillary forces acting on the network as the liquid is expended. Aerogels are generally characterized as having high porosity (up to about 94-98%), and high specific surface area. Aerogels also possess relatively low densities and are unique solids with up to 99% porosity. Such large porosities confer a number of useful properties to aerogels, including high surface area, low refractive index, low dielectric constant, low thermal-loss coefficient, and low sound velocity.

Aerogels made from organic polymers (e.g., polyimides or silica/polyimide blends) provide lightweight, low-density structures; however, they tend to exhibit low glass transition temperatures and degrade at temperatures less than 150° C. Attempts to improve the thermal properties of the aerogels have included cross-linking tri, tetra, or poly-functional units in the structure. NASA Technical Brief LEW 18486-1 describes polyimide aerogels having three-dimensional cross-linked tri-functional aromatic or aliphatic amine groups or, in the alternative, capping long-chain oligomers with latent reactive end caps that can be cross-linked after a post cure of the dried gels. U.S. Pat. No. 8,974,903 to Meader et al. discloses a porous cross-linked polyimide-urea network that includes a subunit having two anhydride end-capped polyamic acid oligomers in direct connection via a urea linkage. U.S. Pat. No. 9,109,088 to Meader et al. discloses cross-linked polyimide aerogels that include cross-linked anhydride end-capped polyamic acid oligomers. While these cross-linked polyimide aerogels have demonstrated good mechanical properties, they are difficult to manufacture commercially, and cross-linked polymers are difficult to reprocess or recycle. The lack of manufacturability and recyclability can have a negative impact on production scale-up, large-scale manufacturing, conformation to irregular surfaces, or maintaining integrity in dynamic conditions.

SUMMARY OF THE INVENTION

A discovery has been made that provides a polyimide aerogel with improved manufacturability and recyclability over conventional polyimide aerogels. The discovery is premised on an aerogel made from a polyimide polymer having a high degree of branching and low or no cross-linking. It was surprisingly found that a large amount of multifunctional monomer could be incorporated into the polyimide structure with a minimal amount to no crosslinking. Without wishing to be bound by theory it is believed that the incorporation of the multifunctional monomer in the polyimide structure contributes to the improved manufacturability and recyclability properties. The methods presented herein provide a novel method for the production of polyimides having little to no crosslinking. Previous polyimide matrix production methods rely upon adding a trifunctional monomer/crosslinking agent and imidizing the chemicals simultaneously or near simultaneously. This concerted process has proven to be difficult to control. The polymers presented herein are more highly branched than previously available polymers.

In some aspects, the present disclosure provides an aerogel that includes an open-cell structure and a branched polyimide matrix. In some embodiments, the matrix contains less than 5% by weight of crosslinked polymers. The branched polyimide matrix of the aerogel composition may include less than 1% by weight of crosslinked polymers. In some embodiments, the branched polyimide matrix of the aerogel composition is not crosslinked. In some embodiments, the aerogel composition includes a hyperbranched polyimide polymer. A hyperbranched polymer is a highly branched macromolecule with three-dimensional dendritic architecture. In some embodiments, the branched polyimides can include a degree of branching (DB) of at least 0.5 branches per polyimide polymer chain. In further embodiments, DB may range from 0.5 to 10, preferably from 1.2 to 8, or more preferably from 3 to 7. In a particular embodiment, the degree of branching is 6.3.

In some embodiments, the branched polyimide can have a general structure of:

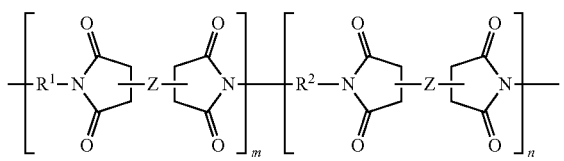

where $R^1$ is a multifunctional amine residue, Z is a di-anhydride residue; $R^2$ is a diamine residue, m is a solution average number per chain ranging from 0.5 to 10, and n is 1 to 25. In further embodiments, branched polyimide can have a general structure of:

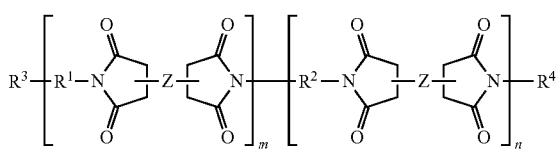

where $R^3$ and $R^4$ are each individually a capping group, $R^3$ is preferably a hydrogen, or alkyl group and $R^4$ is preferably an anhydride residue. Other non-limiting capping groups include amines, maleimides, nadimides, acetylene, biphenylenes, norbornenes, cycloalkyls, and N-propargyl. In some embodiments, $R^1$ is a multifunctional amine residue, and $R^2$ is at least one substituted or unsubstituted diamine residue. The multifunctional amine residue can be a substituted or unsubstituted aliphatic multifunctional amine, a substituted or unsubstituted aromatic multifunctional amine, or a multifunctional amine can include a combination of an aliphatic and at least two aromatic groups, or a combination of an aromatic and at least two aliphatic groups. In particular embodiments, the aromatic multifunctional amine may be 1,3,5,-tris(4-aminophenoxy)benzene, 4,4',4''-methanetriyltrianiline, N,N,N',N'-tetrakis(4-aminophenyl)-1,4-phenylenediamine, or a polyoxypropylenetriamine. In some embodiments, the multifunctional amine can include three primary amine groups and one or more secondary and/or tertiary amine groups, for example, N',N'-bis(4-aminophenyl)benzene-1,4-diamine. In some embodiments, the dianhydride residue can be biphenyl-3,3',4,4'-tetracarboxylic dianhydride; hydroquinone dianhydride; 3,3',4,4'-biphenyltetracarboxylic dianhydride; pyromellitic dianhydride; 3,3',4,4'-benzophenone-tetracarboxylic dianhydride; 4,4'-oxydiphthalic anhydride; 3,3',4,4'-diphenylsulfone-tetracarboxylic dianhydride; 4,4' (4,4' isopropylidenediphenoxy)bis (phthalic anhydride); 2,2-bis(3,4-dicarboxyphenyl)propane dianhydride; 4,4'-(hexafluoroisopropylidene)diphthalic anhydride; bis(3,4-dicarboxyphenyl)sulfoxide dianhydride; polysiloxane-containing dianhydride; 2,2',3,3'-biphenyltetracarboxylic dianhydride; 2,3,2',3' benzophenonetetraearboxylic dianhydride; 3,3',4,4'-benzophenonetetraearboxylic dianhydride; naphthalene-2,3,6,7-tetracarboxylic dianhydride; naphthalene-1,4,5,8 tetracarboxylie dianhydride; 4,4'-oxydiphthalic dianhydride; 3,3',4,4' biphenylsulfone tetracarboxylic dianhydride; 3,4,9,10-perylene tetracarboxylic dianhydride; bis(3,4 dicarboxyphenyl)sulfide dianhydride; bis(3,4 dicarboxyphenyl)methane dianhydride; 2,2-bis(3,4-dicarboxyphenyl)propane dianhydride; 2,2-bis(3,4-dicarboxyphenyl)hexafluoropropene; 2,6-dichloronaphthalene 1,4,5,8-tetracarboxylic dianhydride; 2,7-dichloronapthalene 1,4,5,8 tetracarboxylic dianhydride; 2,3,6,7 tetrachloronaphthalene-1,4,5,8 tetracarboxylic dianhydride; phenanthrene 8,9,10 tetracarboxylic dianhydride; pyrazine-2,3,5,6-tetracarboxylic dianhydride; benzene-1,2,3,4-tetracarboxylic dianhydride; thiophene 2,3,4,5 tetracarboxylic dianhydride; or combinations thereof. In a particular instance the dianhydride can include biphenyl-3,3',4,4'-tetracarboxylic dianhydride, pyromellitic dianhydride, or both. In some embodiments, the diamine is a substituted or unsubstituted aromatic diamine, a substituted or unsubstituted alkyldiamine, or a diamine that includes both aromatic and alkyl functional groups. In some embodiments, the diamine can be 4,4'-oxydianiline; 3,4'-oxydianiline; 3,3'-oxydianiline; para(p)-phenylenediamine; meta(m)-phenylenediamine; orth(o)phenylenediamine; diaminobenzanilide; 3,5-diaminobenzoic acid; 3,3' diaminodiphenylsulfone; 4,4'-diaminodiphenyl sulfones; 1,3-bis-(4-aminophenoxy)benzene; 1,3-bis-(3-aminophenoxy)benzene; 1,4 bis (4 aminophenoxy)benzene; 1,4-bis-(3-aminophenoxy)benzene; 2,2-bis[4-(4-aminophenoxy)phenyl]hexafluoropropane; 2,2-bis(3 aminophenyl) hexafluoropropane; 4,4'-isopropylidenedianiline; 1-(4-aminophenoxy)-3-(3-aminophenoxy)benzene; 1-(4-aminophenoxy)-4-(3-aminophenoxy)benzene; bis[4-(4 aminophenoxy)phenyl]sulfone; bis[4-(3-aminophenoxy) phenyl]sulfone; bis(4-[4-aminophenoxy]phenyl)ether; 2,2'-bis(4-aminophenyl)hexafluoropropene; 2,2'-bis(4-phenoxyaniline)isopropylidene; meta-phenylenediamine; 1,2-diaminobenzene; 4,4'-diaminodiphenylmethane; 2,2-bis(4-aminophenyl)propane; 4,4'diaminodiphenyl propane; 4,4'-diaminodiphenyl sulfide; 4,4-diaminodiphenylsulfone; 3,4'diaminodiphenyl ether; 4,4'-diaminodiphenylether; 2,6-diaminopyridine; bis(3-aminophenyl)diethyl silane; 4,4'-diaminodiphenyldiethylsilane; benzidine-3'-dichlorobenzidine; 3,3'-dimethoxybenzidine; 4,4'-diaminobenzophenone; N,N-bis(4-aminophenyl)butylamine; N,N-bis(4-aminophenyl)methylamine; 1,5-diaminonaphthalene; 3,3'-dimethyl-4,4'-diaminobiphenyl; 4-aminophenyl-3-aminobenzoate; N,N-bis(4-aminophenyl)aniline; bis(p-betaaminotertbutylphenyl)ether; p-bis-2-(2-methyl-4-aminopentyl)benzene; p-bis(1,1-dimethyl-5-aminopentyl)benzene; 1,3-bis(4-aminophenoxy)benzene; m-xylenediamine; p-xylenediamine; 4,4'-diaminodiphenyletherphosphine oxide; 4,4'-diaminodiphenyl N-methylamine; 4,4'-diaminodiphenyl N-phenylamine; amino-terminal polydimethylsiloxanes; amino-terminal polypropyleneoxides; amino-terminal polybutyleneoxides; 4,4'-methylenebis(2-methylcyclohexylamine); 1,2-diaminoethane; 1,3-diaminopropane; 1,4-diaminobutane; 1,5-diaminopentane; 1,6-diaminohexane; 1,7-diaminoheptane; 1,8-diaminooctane; 1,9-diaminononane; 1,10-diaminodecane; 4,4'-methylenebisbenzeneamine; 2,2'-dimethylbenzidine; bisaniline-p-xylidene; 4,4'-bis(4-aminophenoxy)biphenyl; 3,3'-bis(4 aminophenoxy)biphenyl; 4,4'-(1,4-phenylenediisopropylidene)bisaniline; and 4,4'-(1,3-phenylenediisopropylidene) bisaniline, or any combination thereof, preferably, 4,4'-oxydianiline; 2,2'-dimethylbenzidine, or both. In some embodiments, the diamine can include two primary amine groups and one or more secondary and/or tertiary amine groups, for example, 2,2'-(1,2-dimethylhydrazine-1,2-diyl) diethanamine. In some embodiments, $R^1$ is selected from:

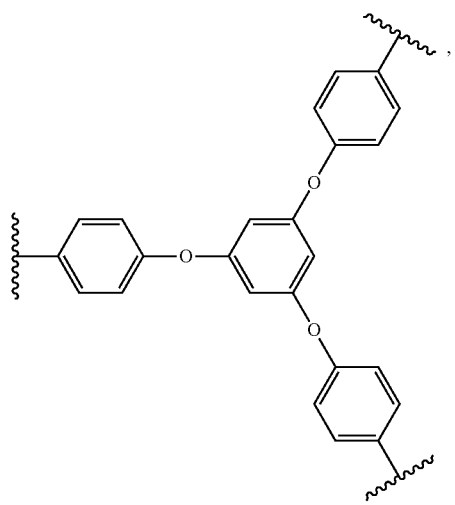

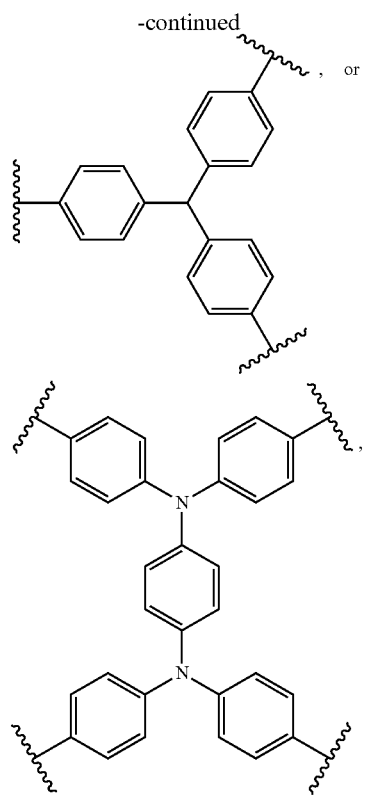

and R² is selected from:

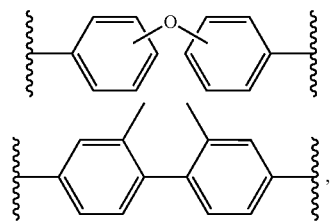

or any combination thereof.

In some aspects, the molar ratio of anhydride to total diamine is from 0.80:1 to 1.2:1. In further aspects, the molar ratio of anhydride to triamine is 8:1 to 125:1. The polyimide can further include a mono-anhydride group, preferably phthalic anhydride.

In some aspects, an article of manufacture is disclosed. The article of manufacture can include an open-cell aerogel with a branched polyimide matrix with less than 5% by weight of crosslinked polymers. In some embodiments, the article of manufacture is a thin film, monolith, wafer, blanket, core composite material, substrate for radiofrequency antenna, a sunscreen, a sunshield, a radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus. In some embodiments, the highly branched polyimide aerogels described herein are included in an antenna, a sunshield, sunscreen, a radome, or a filter.

In some aspects, a method of making the aerogel of the present invention can include, the steps of: (a) providing at least one dianhydride compound to a solvent to form a solution or mixture; (b) providing a multifunctional amine compound and at least one diamine compound to the solution of step (a) under conditions sufficient to form a branched polymer matrix solution, where the branched polymer matrix is solubilized in the solution; and (c) subjecting the branched polymer matrix solution to conditions sufficient to form an aerogel having an open-cell structure. The multifunctional amine and diamine compounds may be added separately or together in one or more portions as solids, neat, or dissolved in an appropriate solvent. In other aspects, a method of making an aerogel can include the steps of: (a) providing a multifunctional amine compound and at least one diamine compound to a solvent to form a solution; (b) providing at least one dianhydride compound to the solution of step (a) under conditions sufficient to form a branched polymer matrix solution, where the branched polymer matrix is solubilized in the solution; and (c) subjecting the branched polymer matrix solution to conditions sufficient to form an aerogel having an open-cell structure. All or a first portion of the multifunctional amine can be added to the solution in step (a). A portion or all of the remainder of the multifunctional amine may be added at any time. In some embodiments, the conditions in step (b) sufficient to form the branched polymer matrix solution can include the steps of (i) adding the dianhydride incrementally to the step (a) solution at a temperature of 20° C. to 30° C., preferably 25° C., until a target viscosity is obtained to form the branched polymer, where the branched polymer is soluble in the solution; (ii) agitating the mixture overnight, or about 8 to 16 hours, at a temperature of 20° C. to 30° C., preferably 25° C. to form the branched polymer matrix solution (iii) adding a sufficient amount of mono-anhydride compound to the solution of step (i) under conditions sufficient to react with any monoamine groups of the branched polymer matrix. In some embodiments, the step of adding the dianhydride incrementally can include (iv) adding a first portion of the dianhydride to the step (a) solution to form a mixture; (v) monitoring the viscosity of the mixture; (vi) adding a second portion of the dianhydride to the solution, where the amount of the second portion is based on the viscosity of the mixture in step (v), or adding a second portion of a multifunctional amine and then a second portion of the dianhydride to the solution, where the amounts of the multifunctional amine and dianhydride are based on the viscosity of the mixture in step (v); and (vi) repeating steps (v) and (vi) until the target viscosity is obtained. In some embodiments, target viscosity of the solution is from 500 to 2000 cP, preferably 1000 to 1500 centipoise (cP). In some embodiments, a method for making an aerogel can include the steps of (I) adding diamine to a solvent; (II) adding 1/X of a pre-determined amount of multifunctional amine to the reaction mixture and stirring for 15 minutes, where X is an integer ranging from 1 to 20; and (III) adding 1/X of a pre-determined amount of a dianhydride to the reaction mixture, and stirring for 20 minutes. Steps (II) and (III) can be repeated X−1 times. In some embodiments, a method for making an aerogel can include the steps of: (I) adding 1/X of a pre-determined amount of the diamine and 1/X of a pre-determined amount of multifunctional amine to the reaction mixture and stirring for 15 minutes, where X is an integer ranging from 1 to 20; and (II) adding 1/X of a pre-determine amount of dianhydride to the reaction mixture, and stirring for 20 minutes. Steps (I) and (II) are then repeated X−1 times. In other embodiments, the branched polyimide matrix contains less than 1% by weight of cross-linked polymers or is not crosslinked. In some aspects, the branched polyimide has a degree of branching of at least 5 branches per polymer chain. In some embodiments, the degree of branching is from 0.5 to 10, or 1.2 to 8, 3 to 7, preferably 6.3 branches. The solvent may be dimethylsulfoxide, diethyl sulfoxide, N,N-dimethylformamide, N,N-diethylformamide, N,N-dimethylacetamide, N,N-diethylacetamide, N-methyl-2-pyrrolidone, 1-methyl-2-pyrrolidinone, N-cyclohexyl-2-pyrrolidone, 1,13-dimethyl-2-imidazolidinone, diethyleneglycoldimethoxyether, o-dichlorobenzene, phenols, cresols, xylenol, catechol, butyrolactones, hexamethylphosphoramide, or a mixture thereof. In a preferred embodiment, dimethyl sulfoxide is the solvent. In some embodiments, the step of subjecting the branched polymer matrix solution to conditions sufficient to form an open-cell structure can include subjecting the branched polymer matrix gel to conditions sufficient to freeze the solvent in to form a frozen material, and subjecting the frozen material from step (i) to a drying step sufficient to form an open-cell structure. In some embodiments, the step of subjecting the branched polyimide solution to conditions sufficient to form an open-cell structure can include removing the solvent under a stream of air. In some embodiments, the step of subjecting the branched polymer matrix solution to conditions sufficient to form an open-cell structure can include the addition of chemical curing agents in appropriate amounts to form a gel. In some embodiments, a method of making an aerogel includes subjecting the branched polyimide solution to at least one solvent exchange with a different solvent. In further embodiments, the different solvent may be exchanged with a second different solvent. In a preferred embodiment, the second different solvent is acetone. In some aspects, a method of making an aerogel includes not subjecting the branched polyimide to crosslinking conditions.

In some aspects, disclosed herein are methods for filtering a fluid using the branched polyimide aerogel described herein. The fluid can contain impurities and/or desired substances. The method can include contacting a feed fluid with the branched polyimide aerogel under conditions sufficient to remove at least a portion of the impurities and/or desired substances from the feed fluid and produce a filtrate. In some instances, the aerogel can be in the form of a film, powder, blanket, or a monolith. In some instances, the feed fluid used in the methods disclosed herein can be a liquid, a gas, a supercritical fluid, or a mixture thereof. The feed fluid can contain water ($H_2O$) and/or be a non-aqueous liquid. The non-aqueous fluid can be an oil, a solvent, or any combination thereof. In some instances, the feed fluid can be a solvent (e.g., an organic solvent). The feed fluid can be an emulsion (e.g., a water-oil emulsion, an oil-water emulsion, a water-solvent emulsion, a solvent-water emulsion, an oil-solvent emulsion, or a solvent-oil emulsion). The feed fluid can be a biological fluid (e.g., blood, plasma, or both). The feed fluid can be a gas (e.g., air, nitrogen, oxygen, an inert gas, or mixtures thereof). In some instances, the filtrate can be substantially free of impurities and/or a desired substance.

In some aspects, the present disclosure provides a system for filtering a fluid that includes impurities and/or desired substances. The system can include the branched polyimide aerogel described herein and a separation zone in fluid communication with the aerogel, a feed fluid and a filtrate.

The following includes definitions of various terms and phrases used throughout this specification.

The terms "impurity" or "impurities" refers to unwanted substances in a feed fluid that are different than a desired filtrate and/or are undesirable in a filtrate. In some instances, impurities can be solid, liquid, gas, or supercritical fluid. In some embodiments, an aerogel can remove some or all of an impurity.

The term "desired substance" or "desired substances" refers to wanted substances in a feed fluid that are different than the desired filtrate. In some instances, the desired substance can be solid, liquid, gas, or supercritical fluid. In some embodiments, an aerogel can remove some or all of a desired substance.

The term "radio frequency (RF)" refers to the region of the electromagnetic spectrum having wavelengths ranging from $10^{-4}$ to $10^7$ m.

The use of the words "a" or "an" when used in conjunction with any of the terms "comprising," "including," "containing," or "having" in the claims or the specification may mean "one," but it is also consistent with the meaning of "one or more," "at least one," and "one or more than one."

The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The term "substantially" and its variations are defined to include ranges within 10%, within 5%, within 1%, or within 0.5%.

The use of the term "or" in the claims is used to mean "and/or" unless explicitly indicated to refer to alternatives only or the alternatives are mutually exclusive, although the disclosure supports a definition that refers to only alternatives and "and/or."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The highly branched polyimide aerogel of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the highly branched polyimide aerogel of the present invention is that it has good mechanical properties.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1:
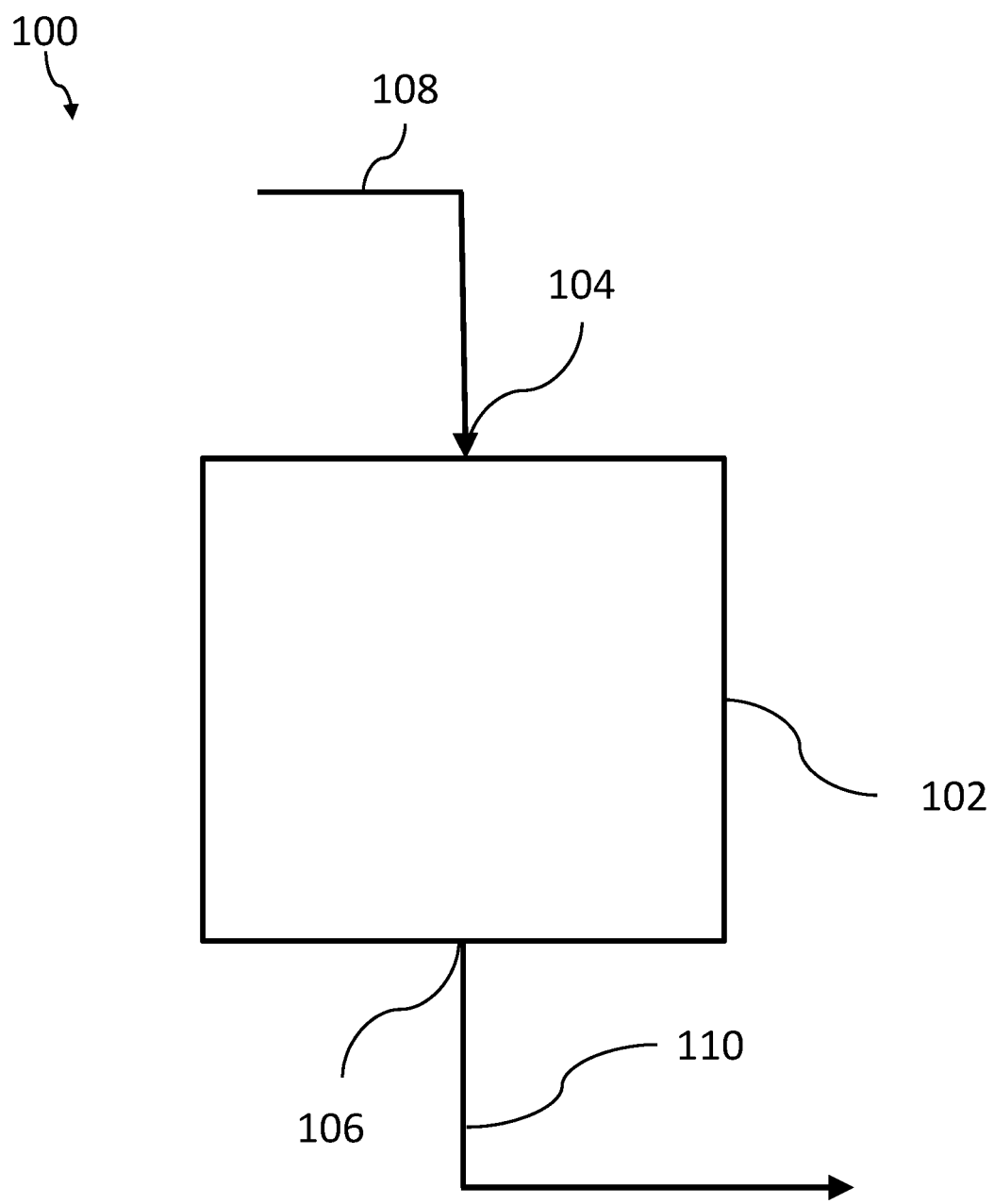
FIG. 1 is a schematic of system of an embodiment for filtering a fluid using a branched polyimide aerogel, the system having a separation zone, an inlet, and an outlet.

While the invention is susceptible to various modifications and alternative forms, specific embodiments thereof are shown by way of example in the drawings and may herein be described in detail. The drawings may not be to scale.

DETAILED DESCRIPTION OF THE INVENTION

A discovery has been made that provides a polyimide aerogel with improved manufacturability and processability over conventional polyimide aerogels. These and other non-limiting aspects of the present invention are discussed in further detail in the following sections.

A. Highly Branched Non-Crosslinked Aerogels

In some aspects, the present disclosure provides an aerogel that includes an open-cell structure and a branched polyimide matrix. In some embodiments, the matrix contains less than 5%, less than 4%, less than 3%, or less than 2% by weight of crosslinked polymers. The branched polyimide matrix of the aerogel composition can include less than 1% by weight of crosslinked polymers. In some embodiments, the branched polyimide matrix of the aerogel composition is not crosslinked.

The characteristics or properties of the final aerogel are significantly impacted by the choice of monomers, which are used to produce the aerogel. Factors to be considered when selecting monomers include the properties of the final aerogel, such as the flexibility, thermal stability, coefficient of thermal expansion (CTE), coefficient of hydroscopic expansion (CHE) and any other properties specifically desired, as well as cost. Often, certain important properties of a polymer for a particular use can be identified. Other properties of the polymer may be less significant, or may have a wide range of acceptable values; so many different monomer combinations could be used. The aerogel composition of the current invention can include a high degree of branching and low degree of crosslinking, which has a positive effect the polymers' mechanical properties. A highly crosslinked polymer can be considered a thermoset polymer, which is a polymer that has been irreversibly cured. The polymers presented herein display a low degree of crosslinking, thereby more closely resembling a thermoplastic. As such, the polymer may be re-shaped and recycled. In some aspects, the current aerogel composition includes polyimides having a large amount of trifunctional, tetrafunctional, or multifunctional monomer, specifically triamine monomer, yet displays little to no crosslinking.

Other factors to be considered in the selection of monomers include the expense and availability of the monomers chosen. Commercially available monomers that are produced in large quantities generally decrease the cost of producing the polyimide polymer film since such monomers are in general less expensive than monomers produced on a lab scale and pilot scale. Additionally, the use of commercially available monomers improves the overall reaction efficiency because additional reactions are not required to produce a monomer, which is incorporated into the polymer.

The highly branched aerogels on the current invention may contain polyimides that include relatively rigid molecular structures such as aromatic/cyclic moieties. These typical structures may often be relatively linear and stiff. The linearity and stiffness of the cyclic/aromatic backbone reduces segmental rotation and allows for molecular ordering which results in lower CTE than many thermoplastic polymers having more flexible chains. In addition, the intermolecular associations of polyimide chains provide resistance to most solvents, which tends to reduce the solubility of many typical polyimide polymers in many solvents. In some aspects, the use of more aliphatic monomers can reduce the stiffness of the aerogel, if desired.

In some embodiments, the aerogel composition can include a hyperbranched polyimide polymer. A hyperbranched polymer is a highly branched macromolecule with three-dimensional dendritic architecture. Hence, the molecular weight of a hyperbranched polymer is not a sufficient parameter that characterizes these polymers. Since the number of possible structures becomes very large as the polymerization degree of macromolecules increases, there is a need to characterize also this aspect of hyperbranched polymers. Thus, the term degree of branching (DB) can be used as a quantitative measure of the branching perfectness for hyperbranched polymers. In some embodiments, the branched polyimides of the current aerogels can include a degree of branching (DB) of at least 0.5 branches per polyimide polymer chain. In further embodiments, DB may range from 0.5 to 10, preferably from 1.2 to 8, or more preferably from 3 to 7. In a particular embodiment, the degree of branching is 6.3. In some aspects, DB may be represented by the following equation:

$$\frac{2Q_T}{3 - Q_T + 3Q_M - 3p}$$

where p is the extent of reaction, and $Q_T$ and $Q_N$ are parameters representing the fractions of monofunctional and trifunctional monomers at the beginning of the reaction according to the following equations:

$$Q_T = \frac{3N_T}{N_M + 2N_B + 3N_T}$$

$$Q_M = \frac{N_M}{N_M + 2N_B + 3N_T}$$

where $N_T$, $N_M$, and $N_B$ are the initial number of trifunctional, monofunctional, and bifunctional monomers, respectively.

In one embodiment, the aerogel of the current invention is a branched polyimide having a general structure of:

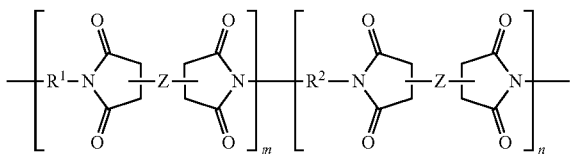

where $R^1$ is a hydrocarbon residue, a branched hydrocarbon residue, a heteroatom substituted hydrocarbon residue, a heteroatom substituted branched hydrocarbon residue, or a multifunctional amine residue, Z is a dianhydride residue; $R^2$ is a diamine residue, m is a solution average number per chain ranging from 0.5 to 1000, 0.5 to 500, 0.5 to 100, or specifically 0.5 to 10, and n is 1 to 1000, 1 to 500, 1 to 100, or specifically 1 to 25. In further embodiments, the aerogel composition branched polyimide can have a general structure of:

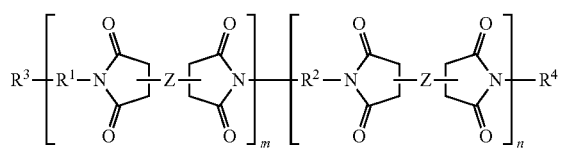

where $R^3$ and $R^4$ are each individually a capping group, $R^3$ is preferably a hydrogen, or alkyl group and $R^4$ is preferably an anhydride residue. Other non-limiting capping groups include amines, maleimides, nadimides, acetylene, biphenylenes, norbornenes, cycloalkyls, and N-propargyl specifically those derived from reagents including 5-norbornene-2,3-dicarboxylic anhydride (nadic anhydride, NA), methyl-nadic anhydride, hexachloro-nadic anhydride, cis-4-cyclohexene-1,2-dicarboxylic anhydride, 4-amino-N-propargylphthalimide, 4-ethynylphthalic anhydride, and maleic anhydride.

In some aspects, the molar ratio of anhydride to total diamine is from 0.4:1 to 1.6:1, 0.5:1 to 1.5:1, 0.6:1 to 1.4:1, 0.7:1 to 1.3:1, or specifically from 0.8:1 to 1.2:1. In further aspects, the molar ratio of dianhydride to multifunctional amine (e.g., triamine) is 2:1 to 140:1, 3:1 to 130:1, 4:1 to 120:1, 5:1 to 110:1, 6:1 to 100:1, 7:1 to 90:1, or specifically from 8:1 to 125:1. The polyimide can also include a mono-anhydride group, including for example 4-amino-1,8-naphthalic anhydride, endo-bicyclo[2.2.2]oct-5-ene-2,3-dicarboxylic anhydride, citraconic anhydride, trans-1,2-cyclohexanedicarboxylic anhydride, 3,6-dichlorophthalic anhydride, 4,5-dichlorophthalic anhydride, tetrachlorophthalic anhydride 3,6-difluorophthalic anhydride, 4,5-difluorophthalic anhydride, tetrafluorophthalic anhydride, maleic anhydride, 1-cyclopentene-1,2-dicarboxylic anhydride, 2,2-dimethylglutaric anhydride 3,3-dimethylglutaric anhydride, 2,3-dimethylmaleic anhydride, 2,2-dimethylsuccinic anhydride, 2,3-diphenylmaleic anhydride, phthalic anhydride, 3-methylglutaric anhydride, methylsuccinic anhydride, 3-nitrophthalic anhydride, 4-nitrophthalic anhydride, 2,3-pyrazinedicarboxylic anhydride, or 3,4-pyridinedicarboxylic anhydride. In some embodiments, the di-anhydride group is phthalic anhydride.

In some embodiments, the branched polyimide matrix contains less than 1% by weight of crosslinked polymers or is not crosslinked. In some aspects, the branched polyimide has a degree of branching of at least 5 branches per polymer chain. In some embodiments, the degree of branching is from 0.5 to 10, 1.2 to 8, or 3 to 7. In some embodiments, the degree of branching can be approximately 6.3 branches.

B. Polyimides

An embodiment of the present invention provides highly branched non-crosslinked aerogels prepared from step-growth polymers. Step-growth polymers are an important group of polymeric chemicals that have many uses and beneficial properties. Step-growth polymers can be formed via step-growth polymerization in which bifunctional or multifunctional monomers react to form first dimers, then trimers, then longer oligomers, and eventually long chain polymers. Generally, step-growth polymers have robust mechanical properties including toughness and high temperature resistance that make them desirable over other polymer types. There are numerous varieties of step-growth polymers, including polyimides, polyurethanes, polyureas, polyamides, phenolic resins, polycarbonates, and polyesters. The aerogels of the current invention are prepared from polyimides.

The characteristics or properties of the final polymer are significantly impacted by the choice of monomers, which are used to produce the polymer. Factors to be considered when selecting monomers include the properties of the final polymer, such as the flexibility, thermal stability, coefficient of thermal expansion (CTE), coefficient of hydroscopic expansion (CHE) and any other properties specifically desired, as well as cost. Often, certain important properties of a polymer for a particular use can be identified. Other properties of the polymer may be less significant, or may have a wide range of acceptable values; so many different monomer combinations could be used.

Polyimides are a type of polymer with many desirable properties. In general, polyimide polymers include a nitrogen atom in the polymer backbone, where the nitrogen atom is connected to two carbonyl carbons, such that the nitrogen atom can be stabilized by the adjacent carbonyl groups. A carbonyl group includes a carbon, referred to as a carbonyl carbon, which is double bonded to an oxygen atom. Polyimides are usually considered an AA-BB type polymer because usually two different classes of monomers are used to produce the polyimide polymer. Polyimides can also be prepared from AB type monomers. For example, an aminodicarboxylic acid monomer can be polymerized to form an AB type polyimide. Monoamines and/or mono anhydrides can be used as end capping agents if desired.

One class of polyimide monomer is usually a diamine, or a diamine monomer. The diamine monomer can also be a diisocyanate, and it is to be understood that an isocyanate could be substituted for an amine in this description, as appropriate. There are other types of monomers that can be used in place of the diamine monomer, as known to those skilled in the art. The other type of monomer is called an acid monomer, and is usually in the form of a dianhydride. In this description, the term "di-acid monomer" is defined to include a dianhydride, a tetraester, a diester acid, a tetracarboxylic acid, or a trimethylsilyl ester, all of which can react with a diamine to produce a polyimide polymer. Dianhydrides are sometimes referred to in this description, but it is to be understood that tetraesters, diester acids, tetracarboxylic acids, or trimethylsilyl esters could be substituted, as appropriate. There are also other types of monomers that can be used in place of the di-acid monomer, as known to those skilled in the art.

Because one di-acid monomer has two anhydride groups, different diamino monomers can react with each anhydride group so the di-acid monomer may become located between two different diamino monomers. The diamine monomer contains two amine functional groups; therefore, after the first amine functional group attaches to one di-acid monomer, the second amine functional group is still available to attach to another di-acid monomer, which then attaches to another diamine monomer, and so on. In this manner, the polymer backbone is formed. The resulting polycondensation reaction forms a poly(amic acid).

The polyimide polymer is usually formed from two different types of monomers, and it is possible to mix different varieties of each type of monomer. Therefore, one, two, or more di-acid monomers can be used, as well as one, two or more diamino monomers. The total molar quantity of di-acid monomers is kept about the same as the total molar quantity of diamino monomers if a long polymer chain is desired. Because more than one type of diamine or di-acid can be used, the various monomer constituents of each polymer chain can be varied to produce polyimides with different properties. For example, a single diamine monomer AA can be reacted with two di-acid co monomers, $B_1B_1$ and $B_2B_2$, to form a polymer chain of the general form of $(AA-B_1B_1)_x-(AA-B_2B_2)_y$, in which x and y are determined by the relative incorporations of $B_1B_1$ and $B_2B_2$ into the polymer backbone. Alternatively, diamine co-monomers $A_1A_1$ and $A_2A_2$ can be reacted with a single di-acid monomer BB to form a polymer chain of the general form of $(A_1A_1-BB)_x-(A_2A_2-BB)_y$. Additionally, two diamine co-monomers $A_1A_1$ and $A_2A_2$ can be reacted with two di-acid co-monomers $B_1B_1$ and $B_2B_2$ to form a polymer chain of the general form $(A_1A_1-B_1B_1)_w-(A_1A_1-B_2B_2)_x-(A_2A_2-B_1B_1)_y-(A_2A_2-B_2B_2)_z$, where w, x, y, and z are determined by the relative incorporation of $A_1A_1-B_1B_1$, $A_1A_1-B_2B_2$, $A_2A_2-B_1B_1$, and $A_2A_2-B_2B_2$ into the polymer backbone. More than two di-acid co-monomers and/or more than two diamine co-monomers can also be used. Therefore, one or more diamine monomers can be polymerized with one or more di-acids, and the general form of the polymer is determined by varying the amount and types of monomers used.

There are many examples of monomers that can be used to make polyimide polymers. In some embodiments, the diamine monomer is a substituted or unsubstituted aromatic diamine, a substituted or unsubstituted alkyldiamine, or a diamine that can include both aromatic and alkyl functional groups. A non-limiting list of possible diamine monomers include 4,4'-oxydianiline, 3,4'-oxydianiline, 3,3'-oxydianiline, p-phenylenediamine, m-phenylenediamine, o-phenylenediamine, diaminobenzanilide, 3,5-diaminobenzoic acid, 3,3'-diaminodiphenylsulfone, 4,4'-diaminodiphenylsulfones, 1,3-bis-(4-aminophenoxy)benzene, 1,3-bis-(3-aminophenoxy)benzene, 1,4-bis-(4-aminophenoxy)benzene, 1,4-bis-(3-aminophenoxy)benzene, 2,2-Bis[4-(4-aminophenoxy)phenyl]-hexafluoropropane, 2,2-bis(3-aminophenyl)-1,1,1,3,3,3-hexafluoropropane, 4,4'-isopropylidenedianiline, 1-(4-aminophenoxy)-3-(3-aminophenoxy)benzene, 1-(4-aminophenoxy)-4-(3-aminophenoxy)benzene, bis-[4-(4-aminophenoxy)phenyl]sulfones, 2,2-bis[4-(3-aminophenoxy)phenyl]sulfones, bis (4-[4-aminophenoxy]phenyl)ether, 2,2'-bis-(4-aminophenyl)-hexafluoropropane, (6F-diamine), 2,2'-bis-(4-phenoxyaniline)isopropylidene, meta-phenylenediamine, para-phenylenediamine, 1,2-diaminobenzene, 4,4'-diaminodiphenylmethane, 2,2-bis(4-aminophenyl)propane, 4,4'diaminodiphenylpropane, 4,4'-diaminodiphenylsulfide, 4,4'-diaminodiphenylsulfone, 3,4'diaminodiphenylether, 4,4'-diaminodiphenylether, 2,6-diaminopyridine, bis(3-aminophenyl)diethyl silane, 4,4'-diaminodiphenyl diethyl silane, benzidine, dichlorobenzidine, 3,3'-dimethoxybenzidine, 4,4'-diaminobenzophenone, N,N-bis(4-aminophenyl)-n-butylamine, N,N-bis(4-aminophenyl)methylamine, 1,5-diaminonaphthalene, 3,3'-dimethyl-4,4'-diaminobiphenyl, 4-aminophenyl-3-aminobenzoate, N,N-bis(4-aminophenyl) aniline, bis(p-beta-amino-t-butylphenyl)ether, p-bis-2-(2-methyl-4-aminopentyl)benzene, p-bis(1,1-dimethyl-5-aminopentyl)benzene, 1,3-bis(4-aminophenoxy)benzene, m-xylenediamine, p-xylenediamine, 4,4'-diaminodiphenyletherphosphine oxide, 4,4'-diaminodiphenyl N-methylamine, 4,4'-diaminodiphenyl N-phenylamine, amino-terminal polydimethylsiloxanes, amino-terminal polypropyleneoxides, amino-terminal polybutyleneoxides, 4,4'-methylenebis (2-methylcyclohexylamine), 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, and 4,4'-methylenebisbenzeneamine, 2,2'-dimethylbenzidine, bisaniline-p-xylidene, 4,4'-bis(4-aminophenoxy)biphenyl, 3,3'-bis(4 aminophenoxy)biphenyl, 4,4'-(1,4-phenylenediisopropylidene)bisaniline, and 4,4'-(1,3-phenylenediisopropylidene)bisaniline, or combinations thereof. In a specified embodiment, the diamine monomer is 4,4'-oxydianiline, 2,2'-dimethylbenzidine, or both.

A non-limiting list of possible dianhydride monomers include hydroquinone dianhydride, 3,3,4,4'-biphenyltetracarboxylic dianhydride, pyromellitic dianhydride, 3,3',4,4'-benzophenonetetracarboxylic dianhydride, 4,4'-oxydiphthalic anhydride, 3,3',4,4'-diphenyl sulfonetetracarboxylic dianhydride, 4,4'-(4,4'-isopropylidenediphenoxy)bis (phthalic anhydride), 2,2-bis(3,4-dicarboxyphenyl)propane dianhydride, 4,4'-(hexafluoroisopropylidene)diphthalic anhydride, bis(3,4-dicarboxyphenyl) sulfoxide dianhydride, polysiloxane-containing dianhydride, 2,2',3,3'-biphenyltetracarboxylic dianhydride, 2,3,2',3'-benzophenonetetraearboxylic dianhydride, 3,3',4,4'-benzophenonetetraearboxylic dianhydride, naphthalene-2,3,6,7-tetracarboxylic dianhydride, naphthalene-1,4,5,8-tetracarboxylic dianhydride, 4,4'-oxydiphthalic dianhydride, 3,3',4,4'-biphenyl sulfonetetracarboxylic dianhydride, 3,4,9,10-perylene tetracarboxylic dianhydride, bis(3,4-dicarboxyphenyl)sulfide dianhydride, bis(3,4-dicarboxyphenyl)methane dianhydride, 2,2-bis(3,4-dicarboxyphenyl)propane dianhydride, 2,2-bis(3,4-dicarboxyphenyl)hexafluoropropane, 2,6-dichloronaphthalene-1, 4,5,8-tetracarboxylic dianhydride, 2,7-dichloronapthalene-1,4,5,8-tetracarboxylic dianhydride, 2,3,6,7-tetrachloronaphthalene-1,4,5,8-tetracarboxylic dianhydride, phenanthrene-, 8,9,10-tetracarboxylie dianhydride, pyrazine-2,3,5,6-tetracarboxylic dianhydride, benzene-1,2,3,4-tetracarboxylic dianhydride, and thiophene-2,3,4,5-tetracarboxylic dianhydride, or combinations thereof. In a specific embodiment, the dianhydride monomer is 3,3',4,4'-biphenyltetracarboxylic dianhydride, pyromellitic dianhydride, or both.

In another embodiment, the polyimides used to prepare the aerogels of the present invention include multifunctional amine monomers with at least three primary amine functionalities. The multifunctional amine may be a substituted or unsubstituted aliphatic multifunctional amine, a substituted or unsubstituted aromatic multifunctional amine, or a multifunctional amine that includes a combination of an aliphatic and two aromatic groups, or a combination of an aromatic and two aliphatic groups. A non-limiting list of possible multifunctional amines include propane-1,2,3-triamine, 2-aminomethylpropane-1,3-diamine, 3-(2-aminoethyl)pentane-1,5-diamine, bis(hexamethylene)triamine, N',N'-bis(2-aminoethyl)ethane-1,2-diamine, N',N'-bis(3-aminopropyl)propane-1,3-diamine, 4-(3-aminopropyl)heptane-1,7-diamine, N',N'-bis(6-aminohexyl)hexane-1,6-diamine, benzene-1,3,5-triamine, cyclohexane-1,3,5-triamine, melamine, N-2-dimethyl-1,2,3-propanetriamine, diethylenetriamine, 1-methyl or 1-ethyl or 1-propyl or 1-benzyl-substituted diethylenetriamine, 1,2-dibenzyldiethylenetriamine, lauryldiethylenetriamine, N-(2-hydroxypropyl)diethylenetriamine, N,N-bis(1-methylheptyl)-N-2-dimethyl-1,2,3-propanetriamine, 2,4,6-tris(4-(4-aminophenoxy)phenyl)pyridine, N,N-dibutyl-N-2-dimethyl-1,2,3-propanetriamine, 4,4'-(2-(4-aminobenzyl)propane-1,3-diyl)dianiline, 4-((bis(4-aminobenzyl)amino)methyl)aniline, 4-(2-(bis(4-aminophenethyl)amino)ethyl)aniline, 4,4'-(3-(4-aminophenethyl)pentane-1,5-diyl)dianiline, 1,3,5-tris(4-aminophenoxy)benzene, 4,4',4"-methanetriyltrianiline, N,N,N',N'-Tetrakis(4-aminophenyl)-1,4-phenylenediamine, a polyoxypropylenetriamine, octa (aminophenyl)polyhedral oligomeric silsesquioxane, or combinations thereof. A specific example of a polyoxypropylenetriamine is JEFFAMINE® T-403 from Huntsman Corporation, The Woodlands, Tex. USA. In a specific embodiment, the aromatic multifunctional amine may be 1,3,5-tris(4-aminophenoxy)benzene or 4,4',4"-methanetriyltrianiline. In some embodiments, the multifunctional amine includes three primary amine groups and one or more secondary and/or tertiary amine groups, for example, N',N'-bis(4-aminophenyl)benzene-1,4-diamine.

In some aspects where a poly(amic acid) or other polyimide precursors, including poly(amic ester) precursors, poly(amic acid) salt precursors, or polyisoimidespoly(amic acid) derivatives are first formed, it may be soluble in the reaction solvent and, thus, the solution may be cast into a film on a suitable substrate. Casting methods can include spin casting, gravure coating, three-roll coating, knife over roll coating, slot die extrusion, dip coating, Meyer rod coating, or other techniques. The cast film can then be heated in stages to elevated temperatures to remove solvent and convert, for example, the amic acid functional groups in the poly(amic acid) to imides with a cyclodehydration reaction, also called imidization. "Imidization" is defined as the conversion of a polyimide precursor into an imide. Alternatively, poly(amic acid)s or other polyimide precursors may be converted in solution to polyimides by using a chemical dehydrating agent, catalyst, and/or heat.

Many polyimide polymers are produced by preparing a poly(amic acid) intermediate in situ. The poly(amic acid) is then formed into a sheet or a film and subsequently processed with heat (often temperatures higher than 250° C.), or both heat and catalysts, to convert the poly(amic acid) to a polyimide. However, some poly(amic acid)s are moisture sensitive, and care must be taken to avoid the uptake of water into the polymer solution. Additionally, some poly (amic acid)s exhibit self-imidization in solution as they gradually convert to the polyimide structure. The imidization reaction generally reduces the polymer solubility and produces water as a by-product. The water produced can then react with the remaining poly(amic acid), thereby cleaving the polymer chain. Moreover, the poly(amic acid)s can generally not be isolated as a stable pure polymer powder. As a result, poly(amic acid)s tend to have a limited shelf life. Shelf life can be extended by storing a poly(amic acid) at reduced temperatures. For example, shelf life can be increased by storing a poly(amic acid) at temperatures less than −20° C.

Polyimides may be synthesized by several methods. In a one method of synthesizing aromatic polyimides, a solution of the aromatic diamine in a polar aprotic solvent, such as N-methylpyrrolidone (NMP), can be prepared. A di-acid monomer, usually in the form of a dianhydride, can be added to this solution, but the order of addition of the monomers can be varied. For example, the di-acid monomer can be added first, or the di-acid monomer and the diamine can be simultaneously added. The resulting polycondensation reaction forms a poly(amic acid), also referred to as a polyamide acid, which is a polyimide precursor. Other polyimide precursors are known, including poly(amic ester), poly(amic acid) salts, poly(silyl ester)s, and polyisoimides. This process description may be applicable to one or more polyimide precursor solutions. Alternatively the polyimide can be formed from the forward or reverse mixing of amines and anhydrides under appropriate dehydrating conditions and/or catalysts where the lifetime of the poly(amic acid) intermediate is very short or possibly not even detectable.

In some instances, the backbone of the polymer can include substituents. The substituents (e.g., oligomers, functional groups, etc.) can be directly bonded to the backbone or linked to the backbone through a linking group (e.g., a tether or a flexible tether). In other embodiments, a compound or particles can be incorporated (e.g., blended and/or encapsulated) into the polyimide structure without being covalently bound to the polyimide structure. In some instances, the incorporation of the compound or particles can be performed during the polyamic reaction process. In some instances, particles can aggregate, thereby producing polyimides having domains with different concentrations of the non-covalently bound compounds or particles.

C. Preparation of Highly Branched Polyimide Aerogels

Aerogels of the present disclosure are made using a multi-step process that includes 1) preparation of the highly branched polyimide gel, 2) solvent exchange, and 3) drying of the polymeric solution to form the aerogel. These process steps are discussed in more detail below.

1. Highly Branched Polyimide Gels

In the preparation of a highly branched polyimide gel at least one acid monomer can be reacted with at least one diamino monomer in a reaction solvent to form a poly(amic acid), which is then contacted with an imidization catalyst in the presence of a chemical dehydrating agent to form a polymerized polyimide gel via an imidization reaction. As discussed above, numerous acid monomers, diamino monomers, and multifunctional amine monomers can be used to synthesize highly branched polyimides having minimal or no cross-linking. In one aspect of the current invention, one or more diamino monomers and one or more multifunctional amine monomers are premixed in one or more solvents and then treated with one or more dianhydrides that are added in sequentially smaller amounts at pre-defined time increments while monitoring the viscosity. In other aspects, the reverse addition can be performed where one or more diamino monomers and one or more multifunctional amine monomers can be added together or separately as solids, neat, or dissolved in an appropriate solvent to a solution or mixture of dianhydride and solvent. The desired viscosity of the polymerized polyimide gel is 20 to 2,000 cP or specifically 500 to 1,000 cP. By performing the reaction using portion-wise addition of dianhydride or one or more diamino monomers and one or more multifunctional amine monomers while monitoring viscosity, a highly branched non-crosslinked aerogel can be prepared. By way of example, a triamine monomer (about 23 equiv.) can be added to the solvent to give desired molar solution (about a 0.0081). To the solution a first diamine monomer (about 280 equiv.) can be added, followed by second diamine monomer (about 280 equiv.). Next a dianhydride (about 552 total equiv.) can be added in sequentially smaller amounts at pre-defined time increments while monitoring the viscosity. The dianhydride can be added to the solution as neat compound, or mixed with a solvent to form a solution or mixture. The dianhydride can be added (e.g., added neat, as a solution, or as a mixture) until the desired viscosity is reached (e.g., 500 to 1,000 cP). For example, a first portion of dianhydride can be added, the reaction can be stirred (e.g., for 20 minutes), a second portion of dianhydride can be added, and a sample of the reaction mixture was then analyzed for viscosity. After stirring for additional time (e.g., for 20 minutes), a third portion of dianhydride can be added, and a sample can be taken for analysis of viscosity. The reaction mixture can then be stirred for a desired period of time (e.g., 10 hours to 12 hours, or overnight), and then a mono-anhydride (about 96 equiv.) can be added. The resulting reaction mixture can be stirred until no more solid is visible. After a desired amount of time (e.g., about 2 hours), the product can be isolated (e.g., filtered).

In other aspects, the reverse addition can be performed where one or more diamino monomers and one or more multifunctional amine monomers can be added together or separately as solids, neat, or dissolved in an appropriate solvent to a solution or mixture of dianhydride and solvent. The desired viscosity of the polymerized polyimide gel is 20 to 2,000 cP or specifically 500 to 1,000 cP. By performing the reaction using portion-wise addition of one or more diamino monomers and one or more multifunctional amine monomers while monitoring viscosity, a highly branched non-crosslinked aerogel can be prepared. By way of example, a dianhydride can be mixed with reaction solvent to form a solution or mixture. One or more diamino monomers can be mixed with a reaction solvent and one or more multifunctional amine monomers can be mixed with a reaction solvent. In some embodiments, a solution of the one or more diamino monomers and the one or more multifunctional amine monomers and reaction solvent can be prepared. A first portion of the one or more diamino monomers and the one or more multifunctional amine monomers can be added to the dianhydride and the resulting reaction mixture can be agitated for a period of time. A second portion of the one or more diamino monomers and the one or more multifunctional amine monomers can then be added to the reaction mixture and the reaction mixture agitated for a period of time. The portion-wise addition of the one or more diamino monomers and the one or more multifunctional amine monomers followed by agitation can be continued until all of the one or more diamino monomers and one or more multifunctional amine monomers is added to the reaction mixture. After addition of all of the one or more diamino monomers and one or more multifunctional amine monomers, a mono-anhydride as a capping agent can be added to the solution, and the resulting reaction mixture can be stirred until no more solid is visible. After a desired amount of time (e.g., about 2 hours), the product can be isolated (e.g., filtered). In some embodiments, the viscosity of the solution is monitored between each addition of the amine compounds.

The reaction solvent can be dimethylsulfoxide, diethylsulfoxide, N,N-dimethylformamide, N,N-diethylformamide, N,N-dimethylacetamide, N,N-diethylacetamide, N-methyl-2-pyrrolidone, 1-methyl-2-pyrrolidinone, N-cyclohexyl-2-pyrrolidone, 1,13-dimethyl-2-imidazolidinone, diethyleneglycoldimethoxyether, o-dichlorobenzene, phenols, cresols, xylenol, catechol, butyrolactones, hexamethylphosphoramide, or mixtures thereof. The reaction solvent and other reactants can be selected based on the compatibility with the materials and methods applied i.e. if the polymerized polyimide gel is to be cast onto a support film, injected into a moldable part, or poured into a shape for further processing into a workpiece. In a specific embodiment, the reaction solvent is dimethylsulfoxide.

In some aspects, a chemical curing system suitable for driving the conversion of polyimide precursor to the polyimide state can be employed. Chemical imidization catalysts may include pyridine, methylpyridines, quinoline, isoquinoline, 1,8-diazabicyclo[5.4.0]undec-7-ene (DBU), DBU phenol salts, carboxylic acid salts of DBU, triethylenediamine, carboxylic acid slats of triethylenediamine, lutidine, N-methylmorpholine, triethylamine, tripropylamine, tributylamine, other trialkylamines, or combinations thereof. Any dehydrating agent suitable for use in formation of an imide ring from an amic acid precursor is also suitable for use in the methods of the present invention. Non-limiting examples of dehydrating agents include acetic anhydride, propionic anhydride, n-butyric anhydride, benzoic, anhydride, trifluoroacetic anhydride, phosphorus trichloride, dicyclohexylcarbodiimide, or combinations thereof.

The polyimide solution can be cast onto a casting sheet covered by a support film for a period of time. In one embodiment, the casting sheet can be a polyethylene terephthalate (PET) casting sheet. After a passage of time, the polymerized gel can be removed from the casting sheet and prepared for the solvent exchange process.

2. Solvent Exchange

After the highly branched non-crosslinked polyimide gel is synthesized, a solvent exchange can be conducted. The solvent exchange can exchange reaction solvent for a second solvent. In one embodiment, the solvent exchange can be conducted where the polymerized gel can be placed inside of a pressure vessel and submerged in a mixture that includes the reaction solvent and the second solvent. Then, a high-pressure atmosphere can be created inside of the pressure vessel thereby forcing the second solvent into the polymerized gel and displacing a portion of the reaction solvent. Alternatively, the solvent exchange step can be conducted without the use of a high-pressure environment. It may be necessary to conduct a plurality of rounds of solvent exchange.

The time necessary to conduct the solvent exchange can depending upon the type of polymer undergoing the exchange as well as the reaction solvent and second solvent being used. In one embodiment, each solvent exchange can range from 1 to 24 hours or any period time there between including 2, 3, 4, 5, 6, 7, 8, 9, 10, 11, 12, 13, 14, 15, 16, 17, 18, 19, 20, 21, 22, or 23 hours. In another embodiment, each solvent exchange can take approximately 30 minutes. Exemplary second solvents include methanol, ethanol, 1-propanol, 2-propanol, 1-butanol, 2-butanol, isobutanol, tert-butanol, 3-methyl-2-butanol, 3,3-dimethyl-2-butanol, 2-pentanol, 3-pentanol, 2,2-dimethylpropan-1-ol, cyclohexanol, diethylene glycol, cyclohexanone, acetone, acetyl acetone, 1,4-dioxane, diethyl ether, dichloromethane, trichloroethylene, chloroform, carbon tetrachloride, water, and mixtures thereof. In a specific embodiment, the second solvent is acetone. Each second solvent shall have a suitable freezing point for drying. For example tert-butyl alcohol has a freezing point of 25.5° C. and water has a freezing point of 0° C. under one atmosphere of pressure.

The temperature and pressure used in the solvent exchange process may be varied. The duration of the solvent exchange process can be adjusted by performing the solvent exchange at a varying temperatures or atmospheric pressures, or both, provided that the pressure and temperature inside the pressure vessel does not cause either the first solvent or the second solvent to leave the liquid phase and become gaseous phase, vapor phase, solid phase, or supercritical fluid. Generally, higher pressures and/or temperatures decrease the amount of time required to perform the solvent exchange, and lower temperatures and/or pressures increase the amount of time required to perform the solvent exchange.

3. Cooling and Drying

In one embodiment after solvent exchange, the highly branched non-crosslinked polymerized gel can be dried under supercritical conditions. In this instance, the solvent in the gel can be removed by supercritical $CO_2$ extraction.

In another embodiment after solvent exchange, the highly branched non-crosslinked polymerized gel can be exposed to subcritical drying. In this instance, the gel can be cooled below the freezing point of the second solvent and subjected to a freeze-drying or lyophilization process to produce the aerogel. For example, if the second solvent is water, then the polymerized gel can be cooled to below the freezing point of water (e.g., about 0° C.). After cooling, the cooled polymerized gel can be subjected to a vacuum for a period of time where the second solvent is allowed to sublime.

In still another embodiment after solvent exchange, the highly branched non-crosslinked polymerized gel can be exposed to subcritical drying with optional heating after the majority of the second solvent has been removed through sublimation. In this instance, the partially dried gel material can be heated to a temperature near or above the boiling point of the second solvent for a period of time. The period of time can range from a few hours to several days, although a typical period of time is approximately 4 hours. During the sublimation process, a portion of the second solvent present in the polymerized gel can be removed, leaving the mesoporous and microporous gel. After the sublimation process is complete, or nearly complete, the highly branched non-crosslinked aerogel is formed.

In yet another embodiment after solvent exchange, the highly branched non-crosslinked polymerized gel can be dried under ambient conditions, for example by removing the solvent under a stream of air or anhydrous gas.

D. Articles of Manufacture

In some aspects, an article of manufacture can include an open-cell aerogel with a branched polyimide matrix with less than 5% by weight of crosslinked polymers. In some embodiments, the article of manufacture can be a thin film, monolith, wafer, blanket, core composite material, substrate for radiofrequency antenna, a sunscreen, a sunshield, a radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus.

1. Fluid Filtration Applications

In some embodiments, the open-cell aerogel with a highly branched polyimide matrix (branched polyimide aerogel) can be used in fluid filtration systems and apparatus. A feed fluid can be contacted with the branched polyimide aerogel such that some, all or, substantially all, of the impurities and/or desired substances are removed from the feed fluid to produce a filtrate essentially devoid of the impurities and/or desired substances. The filtrate, impurities, and/or desired substances can be collected, stored, transported, recycled, or further processed. The highly branched polyimide aerogel can be further processed to release the impurities and/or desired substances from the aerogel.

The highly branched polyimide aerogel described herein can be used in or with filtration apparatuses known in the art. Non-limiting examples of filtration apparatuses and applications include gas filters, building air filters, automotive cabin air filters, combustion engine air filters, aircraft air filters, satellite air filters, face mask filters, diesel particulate filters, in-line gas filters, cylinder gas filters, soot filters, pressure swing absorption apparatus, etc. Additional non-limiting examples of filtration apparatuses and applications include solvent filtration systems, column filtration, chromatography filtration, vacuum flask filtration, microfiltration, ultrafiltration, reverse osmosis filtration, nanofiltration, centrifugal filtration, gravity filtration, cross flow filtration, dialysis, hemofiltration, hydraulic oil filtration, automotive oil filtration, or the like. Further, non-limiting examples of the purpose of filtration include sterilization, separation, purification, isolation, and the like.

A fluid for filtration ("feed") and a filtrate can be any fluid. The fluid can be a liquid, gas, supercritical fluid, or a mixture thereof. In some instances, the fluid can be aqueous, organic, non-organic, biological in origin, or a mixture thereof. In some instances, the fluid can contain solids and/or other fluids. As non-limiting examples, the fluid can be or can be partially water, blood, an oil, a solvent, air, or mixtures thereof. Water can include water, any form of steam and supercritical water.

In some instances, the fluid can contain impurities. Non-limiting examples of impurities include solids, liquids, gases, supercritical fluids, objects, compounds, and/or chemicals, etc. What is defined as an impurity may be different for the same feed fluid depending on the filtrate desired. In some embodiments, one or more aerogels can be used to remove impurities. Non-limiting examples of impurities in water can include ionic substances such as sodium, potassium, magnesium, calcium, fluoride, chloride, bromide, sulfate, sulfite, nitrate, nitrites, cationic surfactants, and anionic surfactants, metals, heavy metals, suspended, partially dissolved, or dissolved oils, organic solvents, non-ionic surfactants, defoamants, chelating agents, microorganisms, particulate matter, and the like. Non-limiting examples of impurities in blood can include red blood cells, white blood cells, antibodies, microorganisms, water, urea, potassium, phosphorus, gases, particulate matter, and the like. Non-limiting examples of impurities in oil can include water, particulate matter, heavy and/or lightweight hydrocarbons, metals, sulfur, defoamants, and the like. Non-limiting examples of impurities in solvents can include water, particulate matter, metals, gases, and the like. Non-limiting impurities in air can include water, particulate matter, microorganisms, liquids, carbon monoxide, sulfur dioxide, and the like.

In some instances, the feed fluid can contain desired substances. Desired substances can be, but are not limited to, solids, liquids, gases, supercritical fluids, objects, compounds, and/or chemicals, and the like. In some embodiments, one or more aerogels can be used to concentrate or capture a desired substance, or remove a fluid from a desired substance. Non-limiting examples of desired substances in water can include ionic substances such as sodium, potassium, magnesium, calcium, fluoride, chloride, bromide, sulfate, sulfite, nitrate, nitrites, cationic surfactants, and anionic surfactants, metals, heavy metals, suspended, partially dissolved, or dissolved oils, organic solvents, nonionic surfactants, chelating agents, microorganisms, particulate matter, etc. Non-limiting examples of desired substances in blood can include red blood cells, white blood cells, antibodies, lipids, proteins, and the like. Non-limiting examples of desired substances in oil can include hydrocarbons of a range of molecular weights, gases, metals, defoamants, and the like. Non-limiting examples of desired substances in solvents can include particulate matter, fluids, gases, proteins, lipids, and the like. Non-limiting examples of desired substances in air can include water, fluids, gases, particulate matter, and the like.

Figure 2:
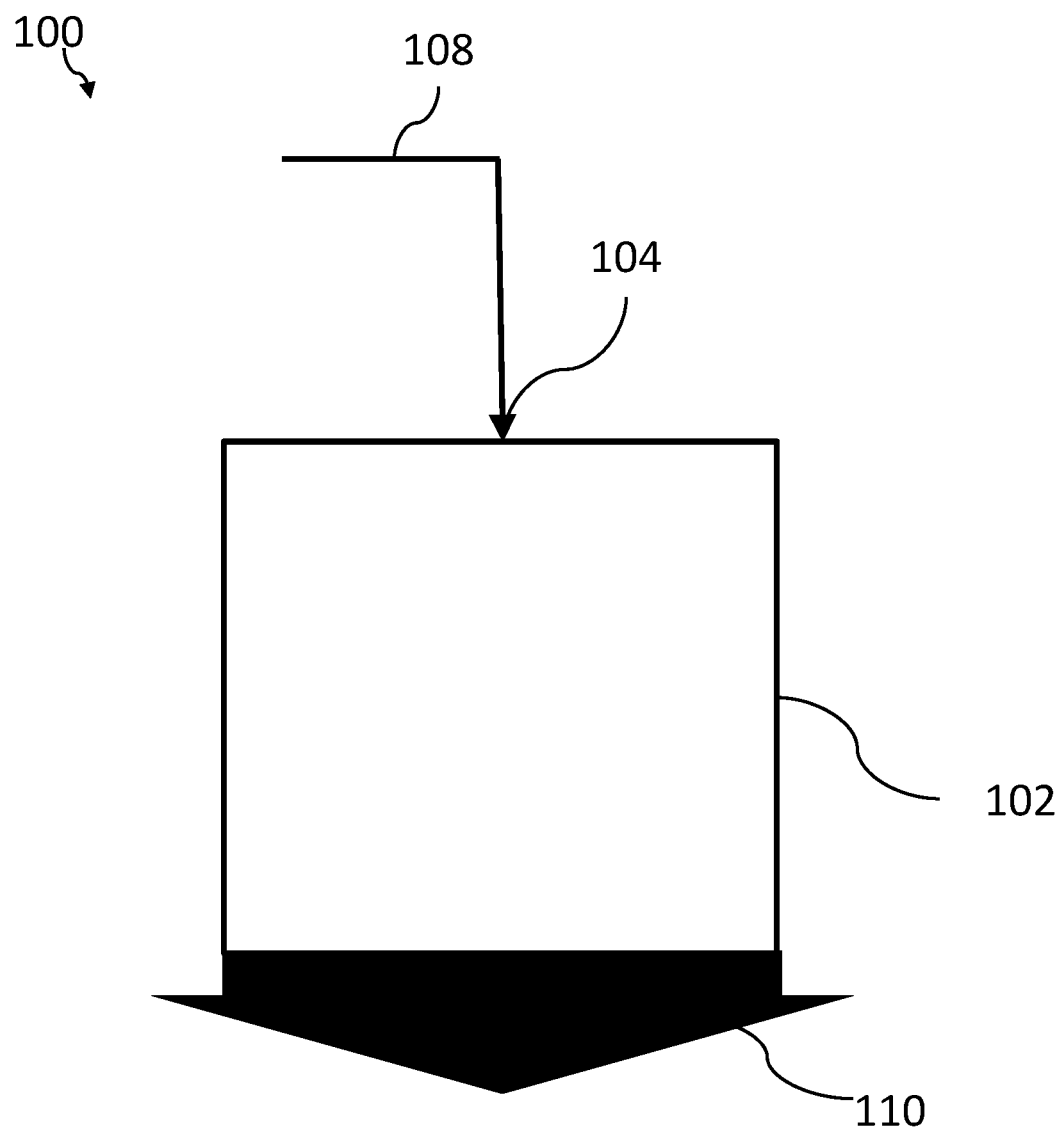
FIG. 2 is a schematic of system of an embodiment for filtering a fluid using a branched polyimide aerogel, the system having a separation zone and an inlet.
Figure 3:
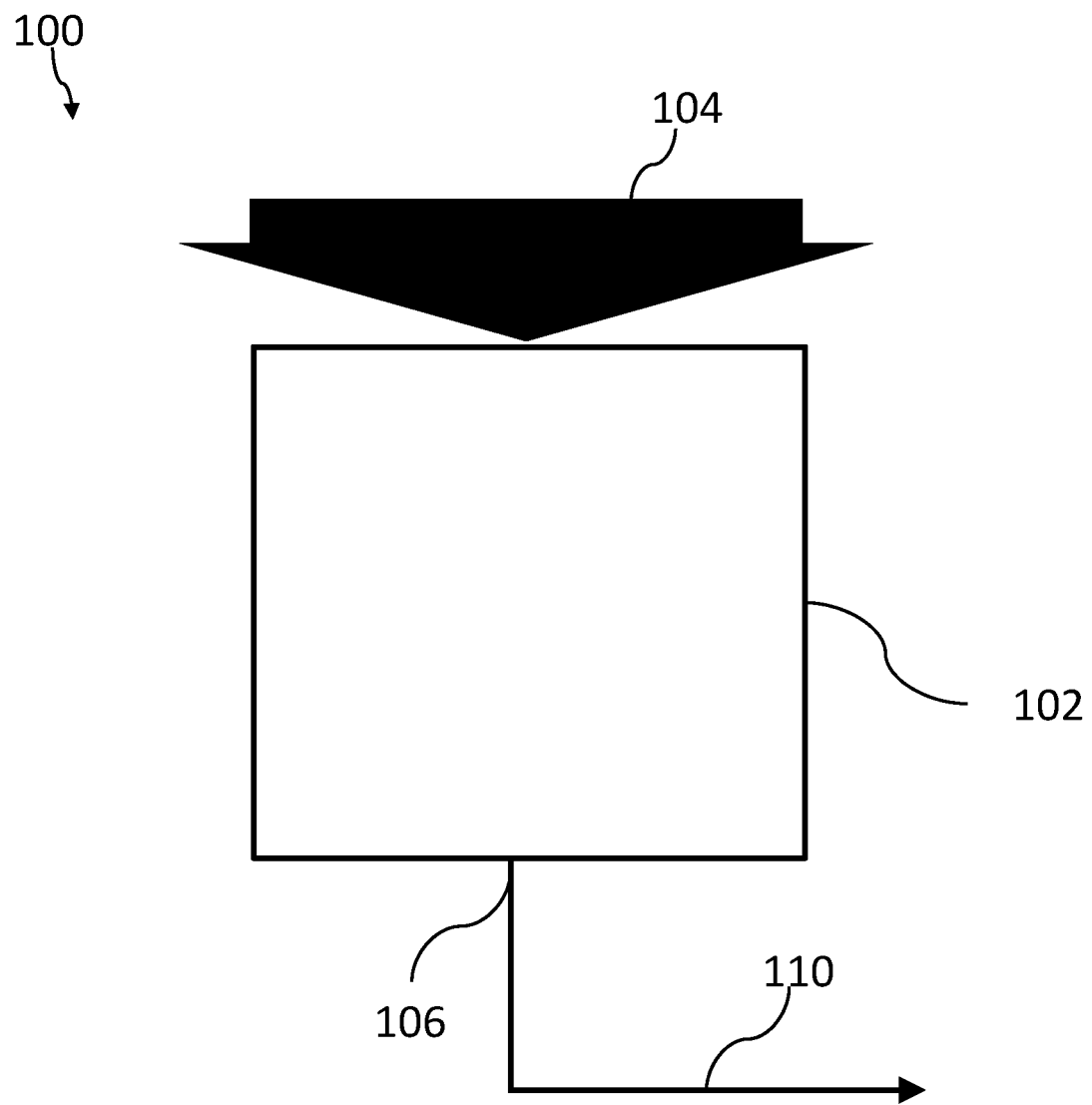
FIG. 3 is a schematic of system of an embodiment for filtering a fluid using a branched polyimide aerogel, the system having a separation zone and an outlet.

FIGS. 1, 2, and 3 are non-limiting schematics of a system 100 used to carry out a filtration of a fluid using an aerogel. System 100 can include a separation zone 102. The materials, size, and shape of the separation zone 102 can be determined using standard engineering practice to achieve the desired flow rates and contact time. The separation zone 102 is capable of holding or may be made of one or more aerogels and includes a feed fluid inlet 104 (inlet) and/or a filtrate outlet 106 (outlet). In some instances, the separation zone is made entirely of one or more branched polyimide aerogels, or one or more branched polyimide aerogels, in, or around, a supporting structure. The feed fluid 108 can be introduced to the separation zone 102 through the inlet 104 (See, FIGS. 1 and 2) or through direct contact with the separation zone 102 (FIG. 3). In some embodiments, the feed fluid 108 can be received under greater or reduced pressure than ambient pressure. Introduction of the feed fluid 108 into separation zone 102 can be at a rate sufficient to allow optimum contact of the feed fluid with the one or more aerogels. Contact of the feed fluid 108 with the aerogel can allow the feed fluid to be filtered by the aerogel, which results in the filtrate 110. The filtrate 110 can have less impurity and/or desired substance when compared with the feed fluid 108. In certain aspects, the filtrate 110 can be essentially free of the impurity and/or the desired substance. The filtrate 110 can exit the separation zone 102 via the outlet 106 (See, FIGS. 1 and 3) or through directly exiting the separation zone 102 (See, FIG. 2). In some instances, the filtrate can be recycled back to a separation zone, collected, stored in a storage unit, etc. In some instances, one or more aerogels can be removed and/or replaced from the separation zone. In some instances, the filtrate 110 can be collected and/or removed from the separation zone 102 without the filtrate 110 flowing through an outlet 106. In some instances, the impurities and/or desired substance can be removed from the separation zone 102. As one non-limiting example, the impurities and/or desired substances can be removed from the separation zone by flowing a fluid through the separation zone in the reverse direction from the flow of the feed fluid through the separation zone.

The filtration conditions in the separation zone 102 can be varied to achieve a desired result (e.g., removal of substantially all of the impurities and/or desired substance from the feed fluid). The filtration conditions include temperature, pressure, fluid feed flow, filtrate flow, or any combination thereof. Filtration conditions are controlled, in some instances, to produce streams with specific properties. The separation zone 102 can also include valves, thermocouples, controllers (automated or manual controllers), computers or any other equipment deemed necessary to control or operate the separation zone. The flow of the feed fluid 104 can be adjusted and controlled to maintain optimum contact of the feed fluid with the one or more aerogel. In some embodiments, computer simulations can be used to determine flow rates for separation zones of various dimensions and various aerogels.

The compatibility of an aerogel with a fluid and/or filtration application can be determined by methods known in the art. Some properties of an aerogel that may be determined to assess the compatibility of the aerogel may include, but is not limited to: the temperature and/or pressures that the aerogel melts, dissolves, oxidizes, reacts, degrades, or breaks; the solubility of the aerogel in the material that will contact the aerogel; the flow rate of the fluid through the aerogel; the retention rate of the impurity and/or desired product form the feed fluid; etc.

2. Radiofrequency (RF) Applications

Due to their low density, mechanical robustness, lightweight, and low dielectric properties, the branched polyimide aerogels can be used in radiofrequency (RF) applications. The use of branched polyimide aerogels in RF applications enables the design of thinner substrates, lighter weight substrates and smaller substrates. Non-limiting examples of radiofrequency applications include a substrate for a RF antenna, a sunshield for a RF antenna, a radome, or the like. Antennas can include flexible and/or rigid antennas, broadband planar-circuited antennas (e.g., a patch antennas, an e-shaped wideband patch antenna, an elliptically polarized circular patch antenna, a monopole antenna, a planar antenna with circular slots, a bow-tie antenna, an inverted-F antenna and the like). In the antenna design, the circuitry can be attached to a substrate that includes the branched polyimide aerogel and/or a mixture of the branched polyimide aerogel and other components such as other polymeric materials including adhesives or polymer films, organic and inorganic fibers (e.g., polyester, polyamide, polyimide, carbon, glass fibers, or combinations thereof), other organic and inorganic materials including silica aerogels, polymer powder, glass reinforcement, etc. The use of branched polyimide aerogels in antennas enables the design substrates with higher throughput. In addition, the branched polyimide aerogels have coefficient of linear thermal expansion (CTE) similar to aluminum and copper (e.g., CTE of about 23/K and about 17 ppm/K), and is tunable through choice of monomer to match CTE of other desirable materials. In some embodiments, the aerogel can be used in sunshields and/or sunscreens used to protect RF antennas from thermal cycles due to their temperature insensitivity and RF transparency. In certain embodiments, the aerogel can be used as a material in a radome application. A radome is a structural, weatherproof enclosure that protects a microwave (e.g., radar) antenna. Branched polyimide aerogels can minimize signal loss due to their low dielectric constant, and can provide structural integrity due to their stiffness.

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

Table 1 lists the acronyms for the compounds used in Examples 1-16.

TABLE 1

| Acronym | Name |
|---------|------|
| BPDA | 4,4'-Biphthalic dianhydride |
| DMB | 4,4'-Diamino-2,2'-dimethylbiphenyl |
| DMSO | Dimethylsulfoxide |
| MPD | m-phenylenediamine |
| PA | Phthalic anhydride |
| PMDA | Pyromellitic dianhydride |
| ODA | 4,4'-Oxydianiline |
| TAPOB | 1,3,5-Tris(4-aminophenoxy) benzene |

Example 1

Preparation of a Highly Branched BPDA/DMB-ODA Polyimide

A reaction vessel with a mechanical stirrer and a water jacket was used. The flow of the water through the reaction vessel jacket was adjusted to maintain temperature in the range of 20-28° C. The reaction vessel was charged with dimethylsulfoxide (DMSO) (108.2 lbs. 49.1 kg), and the mechanical stirrer speed was adjusted to 120-135 rpm. 1,3,5-Tris(4-aminophenoxy) benzene (TAPOB, 65.13 g) was added to the solvent. To the solution was added 4,4'-diamino-2,2'-dimethylbiphenyl (DMB, 1081.6 g), followed by 4'4-oxydianiline (ODA, 1020.2 g). A first portion of 4,4'-Biphthalic dianhydride (BPDA, 1438.4 g) was then added. After stirring for 20 minutes, a sample of the reaction mixture was analyzed for viscosity using a Brookfield DV1 viscometer (Brookfield, AMETEK, U.S.A.). A second portion of BPDA (1407.8 g) was added, and the reaction mixture was stirred for 20 additional minutes. A third portion of BPDA (138.62 g) was added, and the reaction mixture was stirred for 20 minutes. A sample of the reaction mixture was analyzed for viscosity. After stirring for 8 hours, phthalic anhydride (PA, 86.03 g) was added. The resulting reaction mixture was stirred until no more solids were visible. After 2 hours, the product was removed from the reaction vessel, filtered, and weighed.

Example 2

Preparation of a Highly Branched Polyimide Aerogel Monolith by Freeze Drying

The resin (about 10,000 grams) prepared in Example 1 was mixed with triethylamine (about 219 grams) and acetic anhydride (about 561 grams) for five minutes. After mixing, the resultant solution was poured into a square 15"×15" mold and left for 48 hours. The gelled shape was removed from the mold, and placed into an acetone bath. After immersion for 24 hours, the acetone bath was exchanged with fresh acetone. The soak and exchange process was repeated five times. After the final exchange, the bath was replaced with tertiary butyl alcohol. After immersion for 24 hours, the tertiary butyl alcohol bath was exchanged for fresh tertiary butyl alcohol. The soak and exchange process was repeated three times The part was subsequently flash frozen and subjected to subcritical drying for 96 hours in at 5° C., followed by drying in vacuum at 50° C. for 48 hours.

The final recovered aerogel part had open-cell structure as observed by scanning electron microscopy (SEM) performed on a Phenom Pro Scanning Electron Microscope (Phenom-World, the Netherlands), exhibited a density of 0.14 g/cm$^3$ as measured with a Micromeritics® AutoPore V 9605 Automatic Mercury Penetrometer (Micromeritics® Instrument Corporation, U.S.A.), a compression modulus of 2.2 MPa as determined by American Standard Testing Method (ASTM) D395-16, and a compression strength at 25% strain of 3.5 MPa as determined by ASTM D395-16.

Example 3-Comparative Example

Preparation of a Highly Branched Polyimide Aerogel Monolith by Thermal Drying

The resin (about 10,000 grams) prepared in Example 1 was mixed with triethylamine (about 219 grams) and acetic anhydride (about 561 grams) for five minutes. After mixing, the resultant solution was poured into a square 15"×15" mold and left for 48 hours. The gelled shape was removed from the mold and placed into an acetone bath. After immersion for 24 hours, the acetone bath was exchanged with fresh acetone. The soak and exchange process was repeated five times. After the final exchange, the part was dried with an ambient (about 20 to 30° C.) drying process to evaporate a majority of the acetone over 48 hours followed by thermal drying at 50° C. for 4 hours, 100° C. for 2 hours, 150° C. for 1 hour, and then 200° C. for 30 minutes. The final recovered aerogel had an open-cell structure as observed by SEM, and exhibited a density of 0.14 g/cm$^3$, 69 MPa compression modulus, and 1.6 MPa compression strength at 10% strain.

Example 4

Preparation of a Highly Branched Polyimide

TAPOB (about 8.91 g) was added to the reaction vessel charged with DMSO as described in Example 1. To the solution was added DMB (about 78.93 g), followed ODA (about 74.45 g). Pyromellitic dianhydride (PMDA) was added at pre-defined time increments while monitoring the viscosity. A first portion of PMDA (about 70.30 g) was added. After stirring for 20 minutes, a second portion of PMDA (about 70.30 g) was added, stirred for about 20 minutes, and a sample of the reaction mixture was analyzed for viscosity. A third portion of PMDA (about 3.74 g) was added, stirred for about 20 minutes, and a sample was analyzed for viscosity. The reaction mixture was stirred for 8 hours, and phthalic anhydride (PA, about 37.58 g) was added. The resulting reaction mixture was stirred until no more solid was visible. After about 2 hours, the product was removed from the reaction vessel, filtered, and weighed.

Example 5

Preparation of a Highly Branched Polyimide

TAPOB (about 3.33 g) was added to the reaction vessel charged with DMSO as described in Example 1. To the solution was added DMB (about 76.37 g), followed by ODA (72.03 g). A first portion of PMDA (about 73.37 g) was added. After stirring for about 20 minutes, a second portion of PMDA (about 73.37 g) was added, stirred for 20 minutes, and a sample of the reaction mixture was analyzed for viscosity. A third portion of PMDA (about 3.62 g) was added, stirred for about 20 minutes, and a sample was analyzed for viscosity. The reaction mixture was stirred for about 8 hours, at which point PA (about 15.45 g) was added. The resulting reaction mixture was stirred until no more solids were visible. After about 2 hours, the product was removed from the reaction vessel, filtered, and weighed.

Example 6

Preparation of a Highly Branched Polyimide

TAPOB (about 4.31 g) was added to the reaction vessel charged with DMSO as described in Example 1. To the solution was added DMB (about 71.56 g), followed by ODA (67.50 g). PMDA additions were alternated with additions of BPDA in sequential amounts at pre-defined time increments while monitoring the viscosity. A first portion of PMDA (about 34.91 g) was added. After stirring for 20 minutes, a first portion of BPDA (about 37.08 g) was added, stirred for about 20 minutes, and a sample of the reaction mixture was analyzed for viscosity. A second portion of PMDA (about 34.90 g) was added, stirred for about 20 minutes, and a sample of the reaction mixture was analyzed for viscosity. A second portion of BPDA (about 37.07 g) was added, stirred for about 20 minutes, and a sample of the reaction mixture was analyzed for viscosity. A third portion of PMDA (about 1.78 g) was added, stirred for about 20 minutes, and a sample was taken for analysis of viscosity. A third portion of BPDA (about 2.40 g) was added, stirred for about 20 minutes, and a sample of the reaction mixture was analyzed for viscosity. The reaction mixture was stirred for about 8 hours, at which point PA (about 11.09 g) was added. The resulting reaction mixture was stirred until no more solid was visible. After about 2 hours, the product was removed from the reaction vessel, filtered, and weighed.

Example 7

Preparation of a Highly Branched Polyimide

TAPOB (about 4.28 g) was added to the reaction vessel charged with DMSO as described in Example 1. To the solution was added DMB (about 71.14 g), followed by m-phenylenediamine (MPD, about 36.19 g). A first portion of BPDA (about 93.47 g) was added. After stirring for about 20 minutes, a second portion of BPDA (about 93.47 g) was added, stirred for about 20 minutes, and a sample of the reaction mixture was analyzed for viscosity. A third portion of BPDA (about 4.54 g) was added, stirred for about 20 minutes, and a sample was analyzed for viscosity. The reaction mixture was stirred for about 8 hours, at which point PA (about 11.05 g) was added. The resulting reaction mixture was stirred until no more solids were visible. After about 2 hours, the product was removed from the reaction vessel, filtered, and weighed.

Example 8

Preparation of a Highly Branched Polyimide

TAPOB (about 4.28 g) was added to the reaction vessel charged with DMSO as described in Example 1. To the solution was added ODA (about 67.92 g), followed by MPD (about 36.68 g). A first portion of BPDA (about 94.74 g) was added. After stirring for about 20 minutes, a second portion of BPDA (about 94.74 g) was added, stirred for about 20 minutes, and a sample of the reaction mixture was analyzed for viscosity. A third portion of BPDA (about 4.62 g) was added, stirred for about 20 minutes, and a sample was analyzed for viscosity. The reaction mixture was stirred for about 8 hours, at which point PA (about 11.41 g) was added. The resulting reaction mixture was stirred until no more solid was visible. After about 2 hours, the product was removed from the reaction vessel, filtered, and weighed.

Example 9

Preparation of a Highly Branched Polyimide

TAPOB (about 9.69 g) was added to the reaction vessel charged with DMSO as described in Example 1. To the solution was added DMB (about 85.85 g), followed by MPD (about 43.73 g). A first portion of PMDA (about 82.48 g) was added. After stirring for about 20 minutes, a second portion of PMDA (about 82.48 g) was added, stirred for about 20 minutes, and a sample of the reaction mixture was analyzed for viscosity. A third portion of PMDA (about 4.08 g) was added, stirred for about 20 minutes, and a sample was analyzed for viscosity. After stirring for about 8 hours, PA (about 22.90 g) was added. The resulting reaction mixture was stirred until no more solid was visible. After about 2 hours, the product was removed from the reaction vessel, filtered, and weighed.

Example 10

Preparation of a Highly Branched Polyimide

TAPOB (about 9.78 g) was added to the reaction vessel charged with DMSO as described in Example 1. To the solution was added ODA (about 81.68 g), followed by MPD (about 44.11 g). A first portion of PMDA (about 84.51 g) was added. After stirring for about 20 minutes, a second portion of PMDA (about 84.51 g) was added, stirred for about 20 minutes, and a sample of the reaction mixture was analyzed for viscosity. A third portion of PMDA (about 4.16 g) was added, stirred for about 20 minutes, and a sample was analyzed for viscosity. After stirring for about 8 hours, PA (about 19.30 g) was added. The resulting reaction mixture was stirred until no more solids were visible. After about 2 hours, the product was removed from the reaction vessel, filtered, and weighed.

Example 11

Preparation of a Highly Branched Polyimide

TAPOB (about 3.88 g) was added to the reaction vessel charged with DMSO as described in Example 1. To the solution was added DMB (about 64.42 g), followed by 3'4-oxydianiline (3,4-ODA, about 60.76 g). A first portion of BPDA (about 84.76 g) was added. After stirring for about 20 minutes, a second portion of BPDA (about 84.76 g) was added, stirred for about 20 minutes, and a sample of the reaction mixture was analyzed for viscosity. A third portion of BPDA (about 4.12 g) was added, stirred for about 20 minutes, and a sample was taken for analysis of viscosity. After stirring for about 8 hours, PA (about 10.21 g) was added. The resulting reaction mixture was stirred until no more solids were visible. After about 2 hours, the product was removed from the reaction vessel, filtered, and weighed.

Example 12

Preparation of a Highly Branched Polyimide

TAPOB (about 1.25 g) was added to the reaction vessel charged with DMSO as described in Example 1. To the solution was added 4,4'-ODA (about 21.52 g), and stirred for about 20 minutes. To the solution was added BPDA (about 30.62 g). The solution was stirred for about 20 minutes, at which point additional TAPOB (about 1.25 g) was added. The solution was stirred for about 20 minutes, at which point DMB (about 22.85 g) was added. The solution was stirred for about 20 minutes, at which an additional portion of BPDA (about 30.62 g) was added, mixed for about 20 minutes, and a sample of the reaction mixture was analyzed for viscosity. The additions of TAPOB, ODA, BPDA, TAPOB, DMB, and BPDA were repeated two additional times. After stirring for about 8 hours, PA (about 8.79 g) was added. The resulting reaction mixture was stirred until no more solids were visible. After about 2 hours, the product was removed from the reaction vessel, filtered, and weighed.

Example 13

Preparation of a Highly Branched Polyimide

TAPOB (about 1.43 g) was added to the reaction vessel charged with DMSO as described in Example 1. To the solution was added 4,4'-ODA (about 23.85 g), and stirred for about 20 minutes. To the solution was added PMDA (about 25.26 g). The solution was stirred for about 20 minutes, at which point additional TAPOB (about 1.43 g) was added. The solution was stirred for about 20 minutes, at which point DMB (about 25.28 g) was added. The solution was stirred for about 20 minutes, at which an additional portion of PMDA (about 25.26 g) was added, mixed for about 20 minutes, and a sample of the reaction mixture was analyzed for viscosity. The additions of TAPOB, ODA, PMDA, TAPOB, DMB, and PMDA were repeated two additional times. After stirring for about 8 hours, PA (16.91 g) was added. The resulting reaction mixture was stirred until no more solid was visible. After about 2 hours, the product was removed from the reaction vessel, filtered, and weighed.

Example 14

Preparation of a Highly Branched Polyimide

TAPOB (1.43 about g) was added to the reaction vessel charged with DMSO as described in Example 1. To the solution was added 4,4'-ODA (about 13.35 g), and stirred for about 20 minutes. To the solution was added PMDA (about 12.63 g). The solution was stirred for about 20 minutes, at which point additional TAPOB (about 1.43 g) was added. The solution was stirred for about 20 minutes, at which point DMB (about 12.64 g) was added. The solution was stirred for about 20 minutes, at which an additional portion of PMDA (about 12.63 g) was added, stirred for about 20 minutes, and a sample of the reaction mixture was analyzed for viscosity. The additions of TAPOB, ODA, PMDA, TAPOB, DMB, and PMDA were repeated five additional times. After stirring for about 8 hours, PA (about 27.78 g) was added. The resulting reaction mixture was stirred until no more solids were visible. After about 2 hours, the product was removed from the reaction vessel, filtered, and weighed.

Example 15

Preparation of a Highly Branched Polyimide by Reverse Addition

PMDA (about 54.23 g) was added to a reaction vessel charged with DMSO (about 2,857.82 g) as described in Example 1 and mixed for about 20 minutes to form a homogeneous solution. DMB (about 26.56 g), ODA (about 25.05 g), and TAPOB (about 3.09 g) were then added and the solution was stirred for about 20 minutes. The addition of PMDA, DMB, ODA, and TAPOB was repeated two additional times. After stirring for about 8 hours, PA (about 14.66 g) was added. The resulting reaction mixture was stirred until no more solids were visible. After about 2 hours, the product was removed from the reaction vessel, filtered, and weighed.

Example 16

Preparation of a Highly Branched Polyimide by Reverse Addition

PMDA (about 304.68 g) was added to a reaction vessel charged with DMSO (about 1,256.72 g) as described in Example 1 to form a homogeneous solution. Separately, DMB (about 166.70 g), ODA (about 157.23 g), and TAPOB (about 19.40 g) were dissolved in DMSO (1256.72 g) to form a homogeneous solution. This solution was poured into the reaction vessel containing the stirred PMDA solution using an addition funnel over the course of about 10 seconds. After stirring for about 8 hours, PA, (about 91.28 g) was added. The resulting reaction mixture was stirred until no more solids were visible. After about 2 hours, the product was removed from the reaction vessel, filtered, and weighed.

The invention claimed is:
1. An article of manufacture comprising an aerogel, wherein the aerogel comprises:
   (a) an open-cell structure; and
   (b) a branched polymer matrix comprising polyimide polymer chains, wherein the matrix contains less than 5% by weight of crosslinked polymers,
   wherein the branched polymer matrix has a degree of branching of at least 0.5 branches per polyimide polymer chain.
2. The article of manufacture of claim 1, wherein the branched polymer matrix contains less than 1% by weight of crosslinked polymers.
3. The article of manufacture of claim 1, wherein the branched polymer matrix is not crosslinked.
4. The article of manufacture of claim 1, wherein the degree of branching is from 0.5 to 10.
5. The article of manufacture of claim 4, wherein the degree of branching is 6.3.
6. The article of manufacture of claim 1, wherein the article of manufacture is a thin film, a monolith, a wafer, a blanket, a core composite material, a substrate for a radiofrequency antenna, a sunscreen, a sunshield, a radome, a support for a catalyst, or a support for a drug, pharmaceutical, and/or drug delivery system.
7. The article of manufacture of claim 1, wherein the article of manufacture is a filtration apparatus.
8. The article of manufacture of claim 7, wherein the filtration apparatus is an aqueous filtration apparatus, an oil-based filtration apparatus, or a solvent-based filtration apparatus.

9. The article of manufacture of claim 1, wherein the article of manufacture is an insulation material.

10. The article of manufacture of claim 9, wherein the insulation material is for an oil and/or gas pipeline, a liquefied natural gas pipeline, a cryogenic fluid transfer pipeline, apparel, an aerospace application, a building, a car, an automotive application, a radiator, ducting and ventilation, air conditioning, heating and refrigeration, a cooler, packaging, a consumer good, a vibration dampening material, a wire, a cable, or a medical device.

* * * * *